(12) United States Patent
Murata et al.

(10) Patent No.: US 7,860,335 B2
(45) Date of Patent: Dec. 28, 2010

(54) METHOD AND APPARATUS FOR SMART SIGNAL AVERAGING

(75) Inventors: Ronald N. Murata, Normandy Park, WA (US); Bentley E. Northon, Auburn, WA (US)

(73) Assignee: The Boeing Company, Chicago, IL (US)

(*) Notice: Subject to any disclaimer, the term of this patent is extended or adjusted under 35 U.S.C. 154(b) by 827 days.

(21) Appl. No.: 11/566,495

(22) Filed: Dec. 4, 2006

(65) Prior Publication Data
US 2008/0129367 A1 Jun. 5, 2008

(51) Int. Cl.
G06G 7/12 (2006.01)
G06K 9/40 (2006.01)
G06K 9/38 (2006.01)

(52) U.S. Cl. .................. 382/261; 382/270; 382/272; 382/275; 327/355

(58) Field of Classification Search .................. None
See application file for complete search history.

(56) References Cited

U.S. PATENT DOCUMENTS

| | | | | |
|---|---|---|---|---|
| 4,855,943 A * | 8/1989 | Lewis | | 702/189 |
| 4,868,670 A * | 9/1989 | Morton et al. | | 358/447 |
| 5,442,462 A * | 8/1995 | Guissin | | 358/463 |
| 5,459,319 A * | 10/1995 | Norsworthy | | 250/349 |
| 5,789,668 A * | 8/1998 | Coe et al. | | 73/146 |
| 5,818,964 A * | 10/1998 | Itoh | | 382/205 |
| 5,924,091 A * | 7/1999 | Burkhard | | 1/1 |
| 6,295,382 B1 * | 9/2001 | Karanovic | | 382/261 |
| 6,641,541 B1 * | 11/2003 | Lovett et al. | | 600/508 |
| 2001/0027382 A1 * | 10/2001 | Jarman et al. | | 702/179 |
| 2002/0145741 A1 * | 10/2002 | Kosuge et al. | | 356/637 |
| 2004/0032516 A1 * | 2/2004 | Kakarala | | 348/246 |
| 2005/0111751 A1 * | 5/2005 | Avinash | | 382/275 |
| 2006/0178833 A1 * | 8/2006 | Bauer et al. | | 702/19 |
| 2009/0122060 A1 * | 5/2009 | Porat et al. | | 345/424 |

* cited by examiner

*Primary Examiner*—Vikkram Bali
*Assistant Examiner*—Michelle Entezari
(74) *Attorney, Agent, or Firm*—Yee & Associates, P.C.; Baldwin D. Quan

(57) ABSTRACT

A method, apparatus, and computer usable program code for signal-to-noise enhancement. In one illustrative embodiment, a system is provided for signal-to-noise enhancement. The system includes a rank order filter and a comparator. The comparator receives an ordered set of data values from the rank order filter. A signal averager averages a subset of data values selected from the ordered set of data values by the comparator.

20 Claims, 16 Drawing Sheets

SMART AVERAGING

PRIOR ART AVERAGING

SMART AVERAGING

MEAN(SATDI) = 9.80136
STDEV(SATDI) = 1.82225
MAX(SATDI) = 14.2372

PRIOR ART AVERAGING

MEAN(ROUND) = 49.22691
S(ROUND) = 13.29454
MAX(ROUND) = 170.38541

METHOD AND APPARATUS FOR SMART SIGNAL AVERAGING

BACKGROUND INFORMATION

1. Technical Field

The disclosure relates generally to signal processing and in particular to improved signal averaging. Still more particularly, the disclosure relates to a computer implemented method, apparatus, and computer usable program code for applying rank ordering and closeness thresholds to select signal samples or ignore noise samples in signal averaging to enhance a signal-to-noise ratio of a target signal.

2. Background Description

A detector may be a device for detecting, receiving, capturing, recording, or registering a signal containing target data. For example, a detector may include an infrared (IR) detector for detecting infrared radiation signals. An infrared detector can be used in night vision equipment, amongst many other uses, to detect warm targets. However, the data signal captured by a detector may contain noise or clutter in addition to the target or desired signal data.

Noise may be the addition of unwanted data to the signal stream being received by a detector. Noise may be deliberate, as in jamming a radio signal. In other cases, noise may result from equipment problems, such as equipment instability, incorrect antenna modulation, or pointing errors. Noise can also occur due to natural interference, such as signal clutter and radiation induced impulse noise or "spikes".

Signal clutter may be a source of unwanted signals, such as the ground, the sea, weather, buildings, birds, insects, or any other surface, volume or point clutter resulting in unwanted signal data. For example, if radar is utilized to track an airplane, radar signal data regarding the airplane may be target signal data. A radar signal data generated as a result of birds flying within range of the radar may be unwanted signal clutter.

A signal processor may be a hardware device that can utilize various methods to separate target signal data from unwanted noise on the basis of signal characteristics, such as signal amplitude. An important component in a variety of signal processing systems is a signal averager. In signal averaging, a recurring waveform signal can be divided into segments of an appropriate length, for example, one second segments. The segments can be averaged to reduce the amplitude of noise that is uncorrelated with the target signal. The assumption is that target signal data growth with averaging exceeds noise growth and the signal-to-noise (SNR) ratio increases or improves.

However, if the noise is non-stationary noise, conventional signal averaging can degrade the signal-to-noise ratio. In other words, if the noise spikes are not distributed at fixed time or position in the original signal, the noise in the averaged signal can be greater than in the original signal segments. In such a case, the target signal can be more obscured in the averaged signal.

Filtering can be used to isolate target data from noise. However, current linear filtering (matched filtering) procedures require a prior knowledge of the power spectrum of signal, noise, and clutter. Linear filtering generally performs poorly in intermittent, high amplitude spiky (non-stationary) noise because noise and clutter spikes may not be ignored. Instead, noise and clutter spikes may be suppressed according to the convolution characteristics of the filtering waveform. Convolution refers to the transforming of an input data sample to an output sample or group of samples according to the characteristics of the linear filtering kernel. These types of signal matched linear filters do not directly support ignoring data from non-stationary, intermittent noise spikes because the spectrum of intermittent, spiky noise may be a broad band "white" noise spectrum.

Non-linear blanking procedures can be used to filter noise. However, these procedures may require identification and substitution of undesired noise spikes based on the detectable exceedance of the spikes above a slowly varying signal baseline. This situation is may be a "Catch 22" situation because signal baselines that are estimated in intermittent, spiky (non-stationary) noise environments can be highly variable because noisy spikes are not suppressed.

Powerful change detection signal processing procedures that save target signals that move or change their target features can be used to cancel correlated noise or clutter backgrounds on frame to frame subtraction. However, these techniques may not work for stationary target signals imbedded in uncorrelated, non-stationary, "white" noise and clutter.

Therefore, it would be advantageous to have an improved method, apparatus, and computer usable program code for averaging of signal samples that ignores non-stationary noise and clutter interference signal samples in the averaging process.

SUMMARY

Advantageous embodiments of the disclosure provide a computer implemented method, apparatus, and computer usable program code for signal-to-noise enhancement. In one illustrative embodiment, a system is provided for signal-to-noise enhancement. A rank order filter orders a set of signal data values to form an ordered set of signal data values.

A comparator determines a closeness threshold based on the ordered set of signal data values and selects at least one signal data value from the ordered set of signal data values to form a subset of selected data values. A signal data value is selected if a difference between the signal data value and a reference signal data value is less than the closeness threshold. The reference signal data value is a signal data value from the ordered set of signal data values. The signal averager averages the subset of selected data values generated by the comparator to form an average. The signal averager outputs the average as a new signal data value with an enhanced signal-to-noise ratio.

In another illustrative embodiment, an ordered set of signal data values is received. A closeness threshold is determined based on the ordered set of signal data values. At least one signal data value is selected from the set of signal data values to form a subset of selected data values. A signal data value is selected if a difference between the signal data value and a reference signal data value is less than the closeness threshold. The reference signal data value is a signal data value from the ordered set of signal data values. The subset of selected data values is averaged to form an average. The average is output as a new signal data value with an enhanced signal-to-noise ratio.

In another illustrative embodiment, a computer program product having computer usable program code encompasses the steps for signal-to-noise enhancement. The computer program product is executed to perform the steps in the method.

The features, functions, and advantages can be achieved independently in various embodiments of the disclosure or may be combined in yet other embodiments.

BRIEF DESCRIPTION OF THE DRAWINGS

The novel features believed characteristic of the embodiments are set forth in the appended claims. The disclosure itself, however, as well as a preferred mode of use, further objectives and advantages thereof, will best be understood by reference to the following detailed description of an advantageous embodiment when read in conjunction with the accompanying drawings, wherein:

DETAILED DESCRIPTION

Figure 1:
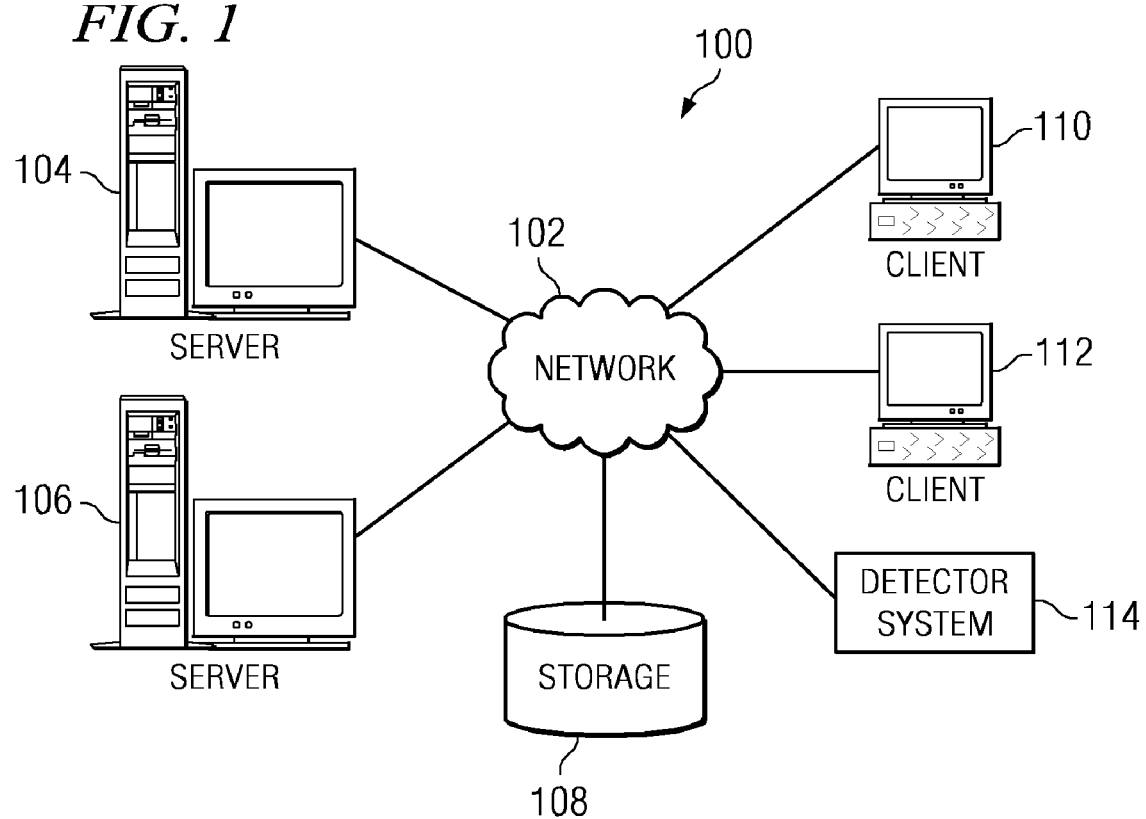
FIG. 1 is an exemplary illustration of a data processing environment in which an advantageous embodiment may be implemented.

With reference now to the figures and in particular with reference to FIG. 1, an exemplary illustration of a data processing environment is provided in which advantageous embodiments may be implemented. It should be appreciated that FIG. 1 is only exemplary and is not intended to assert or imply any limitation with regard to the environment in which different embodiments may be implemented. Many modifications to the depicted environment may be made.

FIG. 1 depicts a pictorial representation of a network of data processing systems in which advantageous embodiments may be implemented. Network data processing system 100 may be a network of computers in which embodiments may be implemented. Network data processing system 100 contains network 102, which may be the medium used to provide communications links between various devices and computers connected together within network data processing system 100. Network 102 may include, but is not limited to, connections, such as wire, wireless communication links, or fiber optic cables.

In the depicted example, server 104 and server 106 connect to network 102 along with storage unit 108. In addition, clients 110 and 112 and detector system 114 connect to network 102. Clients 110 and 112 may be, for example, personal computers or network computers. Clients 110 and 112 are clients to server 104 in this example.

Detector system 114 may be one or more devices for detecting, receiving, capturing, recording, or registering a signal containing target data. Detector system 114 may also be referred to as signal receivers. Detector system 114 captures signal data that contains target signal data plus various forms of noise and/or clutter. Target signal data may be signal data that is desired or required by a user.

Noise and/or clutter refers to unwanted signal data. Detector system 114 provides the output signal data to a computer, such as client 110 and client 112 for signal processing to enhance the target signal data and/or remove noise signal data and clutter signal data. Detector system 114 includes, but is not limited to, radar receivers, infrared detectors, laser detectors, microphones, cameras, radar detectors, accelerometers for measuring object dynamics, or any detection device which outputs a desired target signal that is accompanied by non-target stationary and non-stationary responses, random or systematic.

Further, detector system 114 may be a homogenous detector system in which all the detectors in detector system 114 are detectors of the same type. In other words, in a homogenous detector system, detectors in the system may be equal or equivalent to one another. Detector system 114 may also be a heterogeneous detector system. In a heterogeneous detector system, the detectors that are part of the system can vary, such as in imaging sensors with mosaic detectors that have various levels of detector non-uniformities. Network data processing system 100 may include additional servers, clients, signal detectors, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet may be a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

The different processes for the advantageous embodiments may be implemented in a server, client, or combination of server and client computers. For example, the processes and data may be located at a single client, such as client 110, alternatively, the processes for providing the simulations may be located on a server, such as server 104 with the client containing a process for providing user input and presenting output, such as through a browser program. The different processes for the advantageous embodiments may be implemented in detector systems, such as detector system 114 connected to a network, a server, a client, or combinations of server and client computers.

Figure 2:
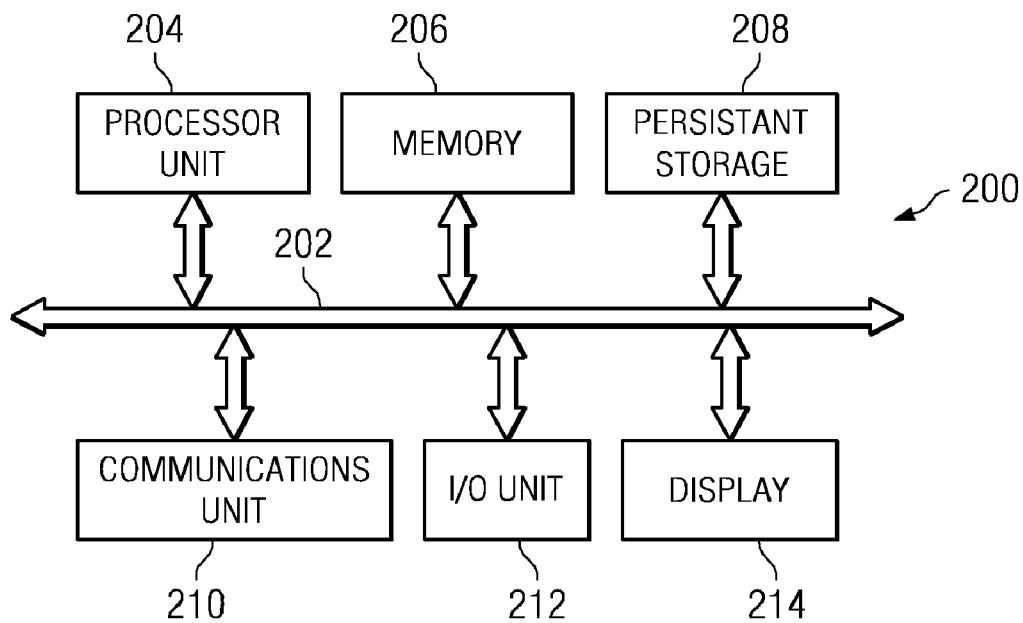
FIG. 2 is an illustration of a data processing system in accordance with an advantageous embodiment.

Turning now to FIG. 2, an illustration of a data processing system is depicted in accordance with an advantageous embodiment. Data processing system 200 is an example of a data processing system that may be used to implement different processes for an advantageous embodiment in a processor unit.

Data processing system 200 may be used to implement different computers, such as, for example, client 110 or server 104 in FIG. 1. In this illustrative example, communications fabric 202 provides communications between processor unit 204, memory 206, persistent storage 208, communications unit 210, I/O unit 212, and display 214. Communications fabric 202 in these examples takes the form of a bus. Of course, communications fabric 202 may take any form that provides communications between the different components of data processing system 200.

Processor unit 204 executes instructions for software that may be loaded into memory 206. Processor unit 204 may be a set of one or more processors or may be a multi-processor core depending on the particular implementation. Memory 206, in these examples, may be, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 may be a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system, the object-oriented programming system, and applications or programs are located on persistent storage 208. These instructions may be loaded into memory 206 for execution by processor unit 204. The processes of the illustrative embodiments may be performed by processor unit 204 using computer implemented instructions, which may be located in a memory, such as memory 206.

Advantageous embodiments provide a computer implemented method, apparatus, and computer usable program code for multi-function signal-to-noise enhancement. In one illustrative embodiment, a system may be provided for multi-function signal-to-noise enhancement. The system includes a set of detectors to generate a set of signal data values. An averaging filter is also provided. The averaging filter includes a rank order filter, comparator, and a signal averager.

The rank order filter orders the set of signal data values. The ordered set of signal data values includes a maximum data value. The comparator determines a closeness threshold based on the ordered set of signal data values. The comparator selects at least one signal data value from the ordered set of signal data values to form a subset of selected data values. A difference between a selected data value in the subset of selected data values and a reference data value may be less than the closeness threshold. The reference data value may be a data value from the ordered set of data values. The signal averager may average the subset of selected data values to form an average. The signal averager may output the average as a new signal data value.

In one embodiment, the reference data value may be a maximum data value. In another example, the reference data value may be a minimum data value. In yet another embodiment, the reference data value may be a data value between the maximum data value and the minimum data value.

The advantageous embodiments provide signal select and noise ignore features that may either ignore high amplitude, intermittent noise spike outliers or select intermittent signal events in a non-aggregating, pick mode of operation by selecting ordered data samples with closeness thresholds for averaging. The selection of ordered data samples for averaging may provide enhanced signal-to-noise ratio in averaged signals.

Figure 3:
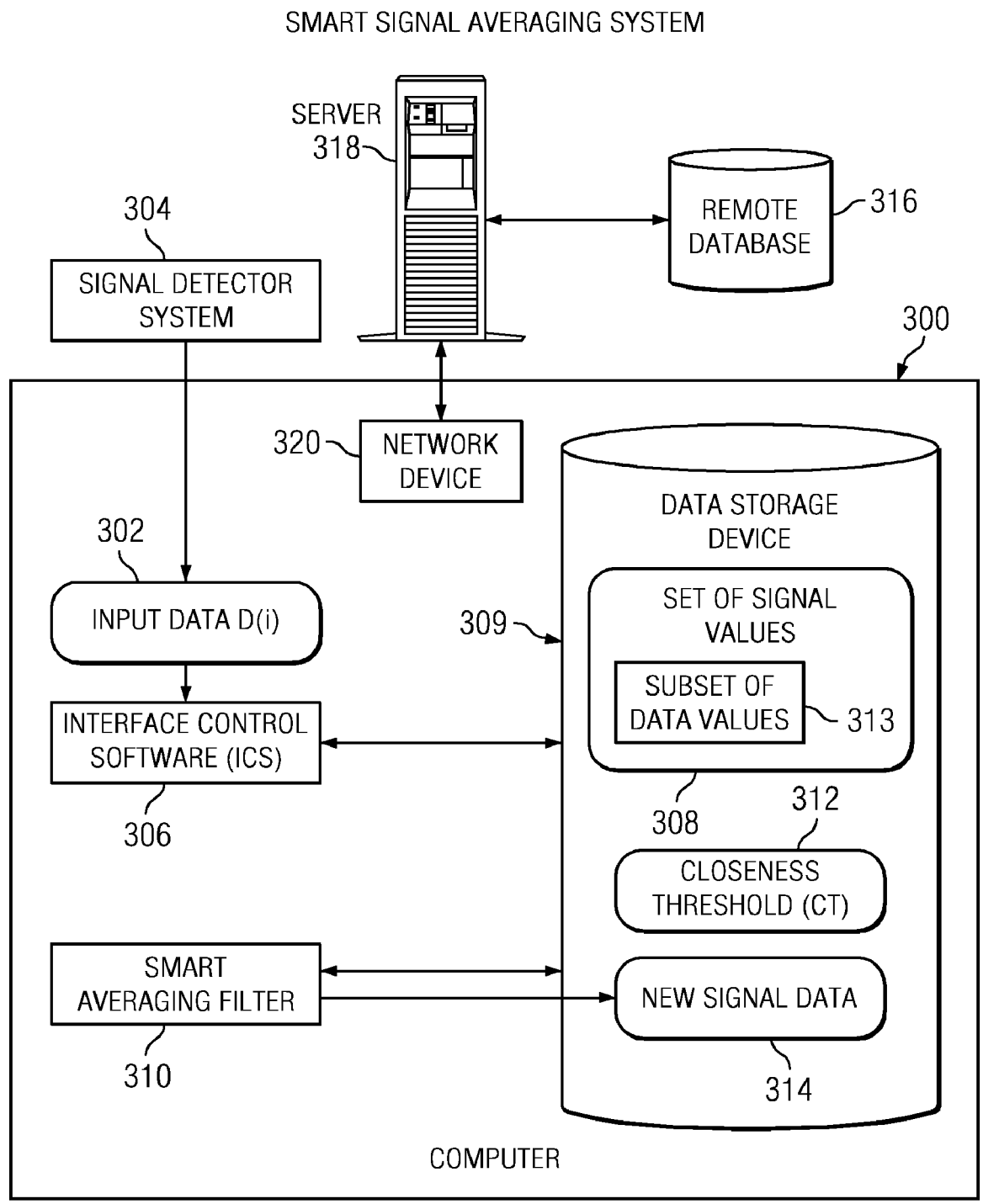
FIG. 3 is an illustration of a data flow through a signal processing system for enhancing a signal-to-noise ratio in accordance with an advantageous embodiment.

FIG. 3 is an illustration of a data flow through a signal processing system for enhancing a signal-to-noise ratio in accordance with an advantageous embodiment. In these examples, computer 300 is any type of computing device, such as a personal computer, laptop, personal digital assistant, or any other computing device depicted in FIGS. 1 and 2. Computer 300 receives input data D(i) 302 from signal detector system 304. Signal detector system 304 can be a system having a single signal detector, as well as a system having two or more signal detectors.

Signal detector system 304 may be one or more devices for detecting, receiving, capturing, recording, or registering a signal containing target data, such as detector system 114 in FIG. 1. Input data D(i) 302 is a signal stream contaminated by intermittent, non-stationary noise. Input data contaminated by non-stationary noise includes, but is not limited to, signals imbedded in intermittent, high amplitude radiation environments, such as nuclear induced noise spikes, solar glints, bad blinking infrared detectors, infrared detectors exposed to cosmic radiation fields (gamma spikes), random digital data dropouts, a damaged shutter causing intermittent signal blockage and time-dependent bad pixels in some warm solid state detector arrays, laser radars with pointing instabilities, and other non-gauss noise or interference processes.

Interface control software (ICS) 306 is software for formatting input data D(i) 302 for use by smart averaging filter 310. Interface control software 306 formats input data 302 into signal segments to form a set of signal data values 308. Set of signal data values 308 is a set of two or more signal samples or signal data values.

Input data 302 can be received by interface control software 306 in a serial mode or in parallel mode. Input data 302 may be pushed down on a data stack in a data storage device, such as data storage device 309. Data storage device 309 contains a database for storing information, such as storage 108 in FIG. 1.

In this example, smart averaging filter 310 is a filter for averaging two or more data values from a set of signal data values 308 contaminated by intermittent, non-stationary noise and clutter to increase signal-to-noise performance metrics compared to conventional signal averaging procedures. Smart averaging filter 310 orders the set of signal data values 308 by amplitude to create an ordered set of signal data values. Amplitude is the maximum displacement of a periodic wave or magnitude of wave oscillations. Thus, signal data values can be ordered from a minimum amplitude data value to a maximum amplitude signal data value to generate an ordered set of signal data values. The ordered set of signal data values may be stored in data storage device 309.

Smart averaging filter 310 calculates closeness threshold 312 based on the ordered set of signal data values. Closeness threshold 312 is a threshold data value for use in selecting one or more data values from a set of signal data values 308 for averaging. Closeness threshold 312 is stored in data storage device 309.

Smart averaging filter 310 compares each signal data value in the ordered set of signal data values to the closeness threshold. If a signal data value is within a data value range for closeness threshold 312, smart averaging filter 310 selects the signal data value to form a selected subset of data values 313. Thus, closeness threshold 312 may be used to select signal data values with little or no non-stationary noise and exclude signal data values with a threshold amount of non-stationary noise.

In other words, smart averaging filter 310 may select a subset of data values 313, which does not contain non-stationary noise contamination that is above the threshold level. Smart averaging filter 310 averages the subset of data values to obtain a signal average and signal variance. Smart averaging filter 310 outputs the signal average as new signal data 314. New signal data 314 may be an averaged signal with an enhanced signal-to-noise ratio. In this manner, a signal average with a greater signal-to-noise ratio may be generated.

In this example, data storage device 309 may be a database. Data storage device 309 is located on or locally to computer 300. However, data storage device 309 can also be located remotely to computer 300, such as remote database 316. Remote database 316 is any type of database for storing a collection of data that is located remotely from computer 300. In this illustrative example, remote database 316 is located on server 318.

Server 318 is any type of server, such as server 104 and 106 in FIG. 1. Server 318 can be a server on a network, such as network 102 described in FIG. 1. Computer 300 accesses remote database 316 on server 318 through a network connection via network device 320.

Network device 320 may be any type of network access software known or available for allowing computer 300 to access a network. Network device 320 connects to a network connection, such as network 102 in FIG. 1. The network connection permits access to any type of network, such as a local area network (LAN), a wide area network (WAN), or the Internet.

Figure 4:
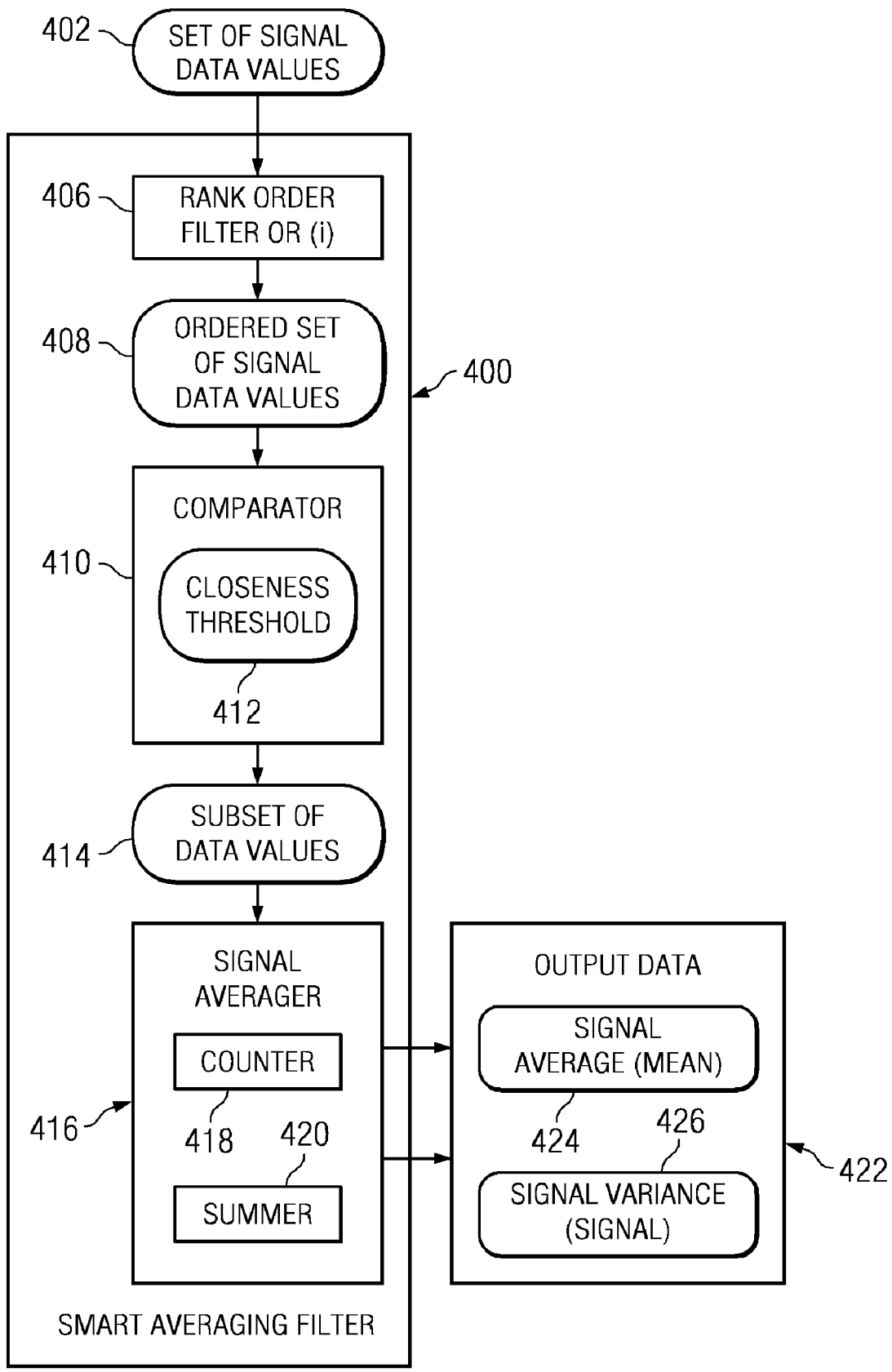
FIG. 4 is an illustration of components for a smart averaging filter in accordance with an advantageous embodiment.

Referring now to FIG. 4, an illustration of components for a smart averaging filter is depicted in accordance with an advantageous embodiment. Smart averaging filter 400 is a filter, such as averaging filter 310 in FIG. 3. In the depicted embodiment, smart averaging filter 400 may be a filter for utilizing rank ordering and a closeness threshold to select a subset of data signal values for averaging to improve signal-to-noise ratio.

Set of signal data values 402 is a set of segments from a recurring signal waveform or a signal data stream, such as the set of signal data values 308 in FIG. 3. Each data value in a set of signal data values 402 may be a signal sample or signal segment from an input data stream. In this example, set of signal data values 308 contains unwanted noise signals interfering with identification of a desired target signal and may be considered contaminated.

In this illustrative example, rank order filter (OR) 406 may be implemented as a software component for ordering data values in accordance with a signal variable, such as signal amplitude. For example, rank order filter 406 orders the data values in a range from OR(1) for a minimum amplitude to OR(N) for a maximum amplitude.

In this example, rank order filter 406 retrieves set of signal data values 402 from a data storage device, such as a data stack in memory. Rank order filter 406 may orders each sample data value in the set of data values based on a signal amplitude of each sample data value. Ordered set of signal data values 408 includes a maximum data value and a minimum data value.

Comparator 410 may be a software component for calculating closeness threshold 412 and selecting a subset of data values for averaging. Comparator 410 may receive ordered set of signal data values 408 from rank order filter 406. Comparator 410 calculates closeness threshold 412 based on ordered set of signal data values 408.

In particular, comparator 410 calculates closeness threshold 412 by multiplying a standard deviation for ordered subset of data values 414 by a user selected integer. In the alternative, comparator 410 can calculate closeness threshold 412 by dividing a difference between the maximum data value and a minimum data value for the set of signal data values by a user selected integer to form a closeness threshold. In other words, closeness threshold 412 may be set relative to rank ordering of signal data values rather than from average signal baseline as in conventional signal averaging processes.

Comparator 410 selects at least one signal data value from ordered set of signal data values 408 to form subset of data values 414. Comparator 410 selects data values for the subset of data values if a difference between a given data value and a reference signal data value is less than closeness threshold 412. The reference signal data value is a signal data value from the ordered set of signal data values.

In this illustrative example, the reference signal data value is a maximum (MAX) signal data value. In other words, after rank order sorting of N signal samples by amplitude rank with rank 1=lowest or minimum (MIN) rank and rank N=maximum (MAX) rank then Order N=Maximum Value. Thus, the maximum signal data value is the signal data value in the ordered set of signal data values that is ranked as the maximum rank. In this example, the reference data value is a maximum data value because low data value signals in the set of ordered data values are unwanted noise signals In an alternative embodiment, comparator 410 rejects or excludes a data value from the subset of data values if a difference between the signal data value and a minimum data value is less than the closeness threshold. In other words, the reference signal data value is a minimum data value. The reference signal data value is a minimum data value where high data value signals in the set of ordered data values are unwanted noise signals from interference spikes.

In yet another embodiment, the reference signal data value is an ordered data value between a maximum data value and a minimum data value. A reference signal data value between a maximum and a minimum data value might be desirable where both high data value signals and low data value signals in the set of ordered data values are unwanted noise signals. In addition, a reference signal data value can be any ordered data value or combinations of ordered data values between the maximum and minimum data values.

In this manner, comparator 410 can be controlled to either ignore high amplitude, intermittent noise spike outliers or select intermittent signal events in a non-aggregating pick/select mode of operation by selecting data values based on closeness threshold 412.

Signal averager 416 is a software component for averaging subset of data values 414. Signal averager 416 includes counter 418 and summer 420. Counter keeps track of the number of data values in subset of data values 414 selected by comparator 410. Each time comparator 410 selects a data value for the subset of data values, counter 418 increments a counter index by one (1). Summer 420 adds or sums the data values in subset of data values 414.

Signal averager 416 divides the sum obtained from summer 420 by the counter sum obtained from counter 418 to generate a signal average 424. Signal averager 416 can also calculate a signal variance 426 for subset of data values 414. Signal averager 416 calculates variances using a single pass data flow.

Signal averager 416 generates output data 422 for utilization by a user, another signal processing device, and/or another computer for use in identifying a target signal. Output data 422 includes signal average 424 and signal variance 426.

Signal average 424 is new signal data value with enhanced or improved signal-to-noise ratio to enable a user to more accurately identify the target data as compared to the original input signal data.

In this illustrative example, closeness threshold 412 is calculated by comparator 410 in one of two ways, as (1) a multiple of the standard deviation of the input data in the absence of signal abnormalities or (2) by dividing the difference between the maximum rank ordered data value and the minimum rank ordered data value by a user input integer. However, closeness threshold 412 can also be a predefined or default threshold value. In this instance, comparator 410 retrieves the predefined closeness threshold value from a data storage device.

In another illustrative example, closeness threshold 412 is a user defined value. In this example, comparator 410 prompts a user to enter a user defined closeness threshold value. The user defined closeness threshold values is then stored in a data storage device for later use by comparator 410 to select subset of data values 414. Smart averaging filter 400 is illustrated as being implemented in software but could be implemented entirely in hardware or in a combination of hardware and software. For example, smart averaging could be implemented as a set of algorithms programmed in MATHCAD® and C languages and uploaded into personal and main frame computers, such as any type of computing device shown in FIGS. 1 and 2.

Figure 5:
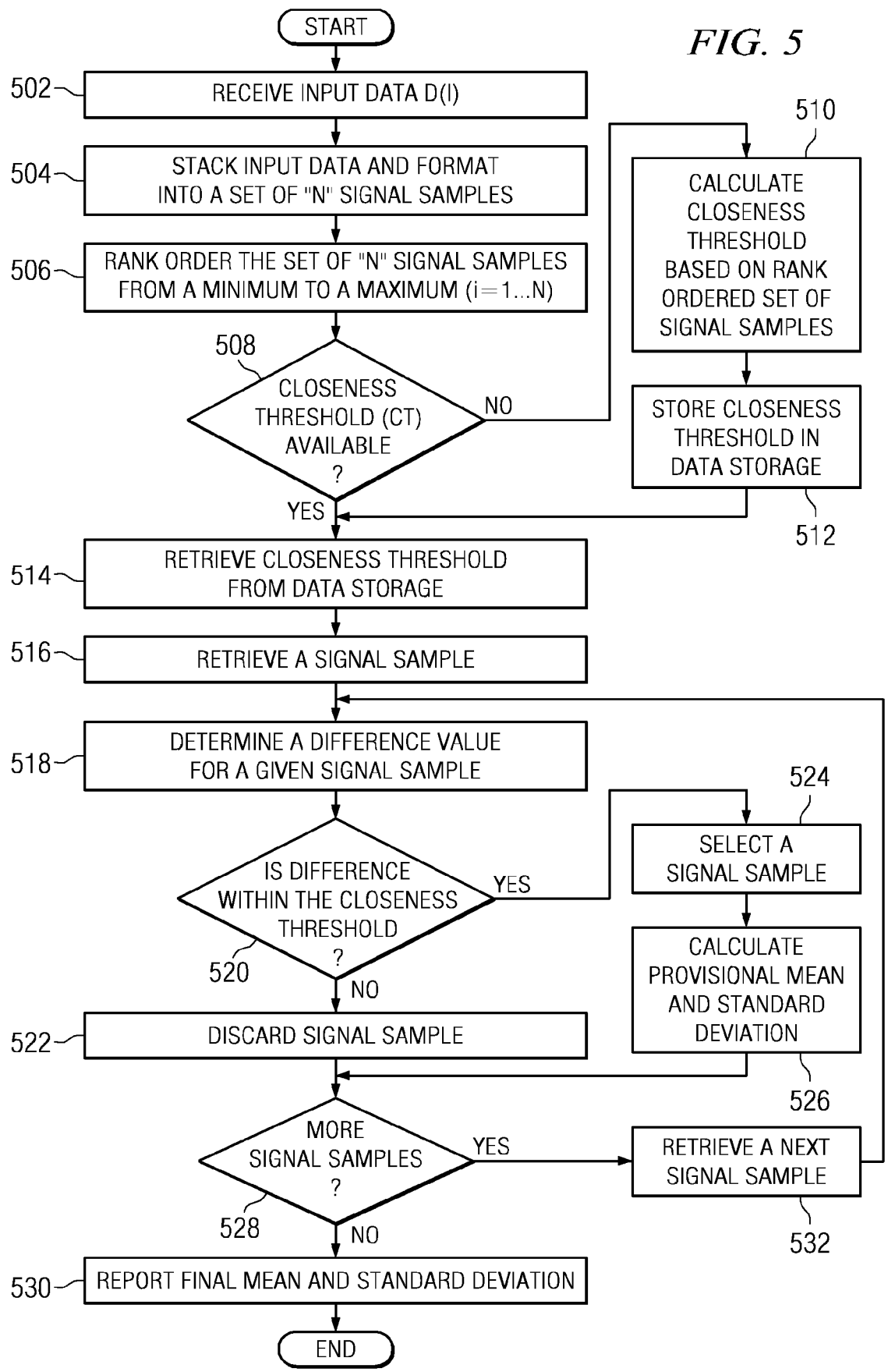
FIG. 5 is a flowchart of a process for smart signal averaging in accordance with an advantageous embodiment.

Turning now to FIG. 5, a flowchart of a process for smart signal averaging is shown in accordance with an advantageous embodiment. The different operations shown in FIG. 5 are implemented by a filtering system, such as smart averaging filter 310 in FIG. 3 and smart averaging filter 400 in FIG. 4.

The process begins by receiving input data (operation 502). Input data is placed in a data stack and formatted into a set of "N" signal samples (operation 504). The set of "N" signal samples is a set of signal data values, such as set of signal data values 308 in FIG. 3. The set of "N" signal samples are rank ordered from a minimum data value to a maximum data value (operation 506). In this illustrative example, the signal samples are ranked according to amplitude. In particular, the signals are ranked from a minimum amplitude data value to a maximum amplitude data value. The ordered set of "N" signal samples is an ordered set of signal data values, such as ordered set of signal data values 408 in FIG. 4.

A determination is made as to whether a closeness threshold is available in a database (operation 508). If a closeness threshold is not available, a closeness threshold value is calculated based on the rank ordered set of signal samples (operation 510). The calculated closeness threshold is stored in data storage, such as storage 108 in FIG. 1 (operation 512).

If a closeness threshold is available in the data storage at operation 508 or if a new closeness threshold has been calculated and saved in data storage at operation 512, the closeness threshold is retrieved from data storage (operation 514). A signal sample is retrieved from the ordered set of signal samples (operation 516). A difference value for a given signal sample is calculated (operation 518). For example, a difference value may be calculated as a difference between a data value for the given signal sample and a data value for a maximum amplitude ranked signal sample. Likewise, a difference value can also be a difference between a data value for a given signal sample and a data value for a minimum amplitude ranked signal sample is a difference value.

A determination is made as to whether the difference value is within the closeness threshold (operation 520). For example, if the difference value is less than a closeness threshold, the difference value can be considered to be within the closeness threshold. Likewise, if the difference is greater than the closeness threshold, the difference could be considered to be within the closeness threshold, depending on the standards selected to compare the signal sample with the closeness threshold.

If the difference value is not within the closeness threshold, the signal sample is discarded or excluded from the subset of signal samples (operation 522). If the difference is within the closeness threshold, the signal sample is selected for inclusion within the subset of signal samples (operation 524). The selected signal sample forms a subset of selected signal samples. If any other signal samples are selected based on the closeness threshold, those other selected signal samples are added to the subset of signal samples. A provisional mean and standard deviation for the subset of signal samples is calculated (operation 526). A provisional mean is an average.

A determination is made as to whether any more unprocessed signals remain in the ordered set of signal samples (operation 528). If no more signal samples remain, a final mean (average) and standard deviation for the subset of selected signal samples is reported (operation 530) with the process terminating thereafter.

If more signal samples remain, the next unprocessed signal sample is retrieved from the ordered set of signal samples (operation 532). The process iteratively through operations 518-532 until all signal samples have been selected or discarded, with the process terminating thereafter.

Figure 6:
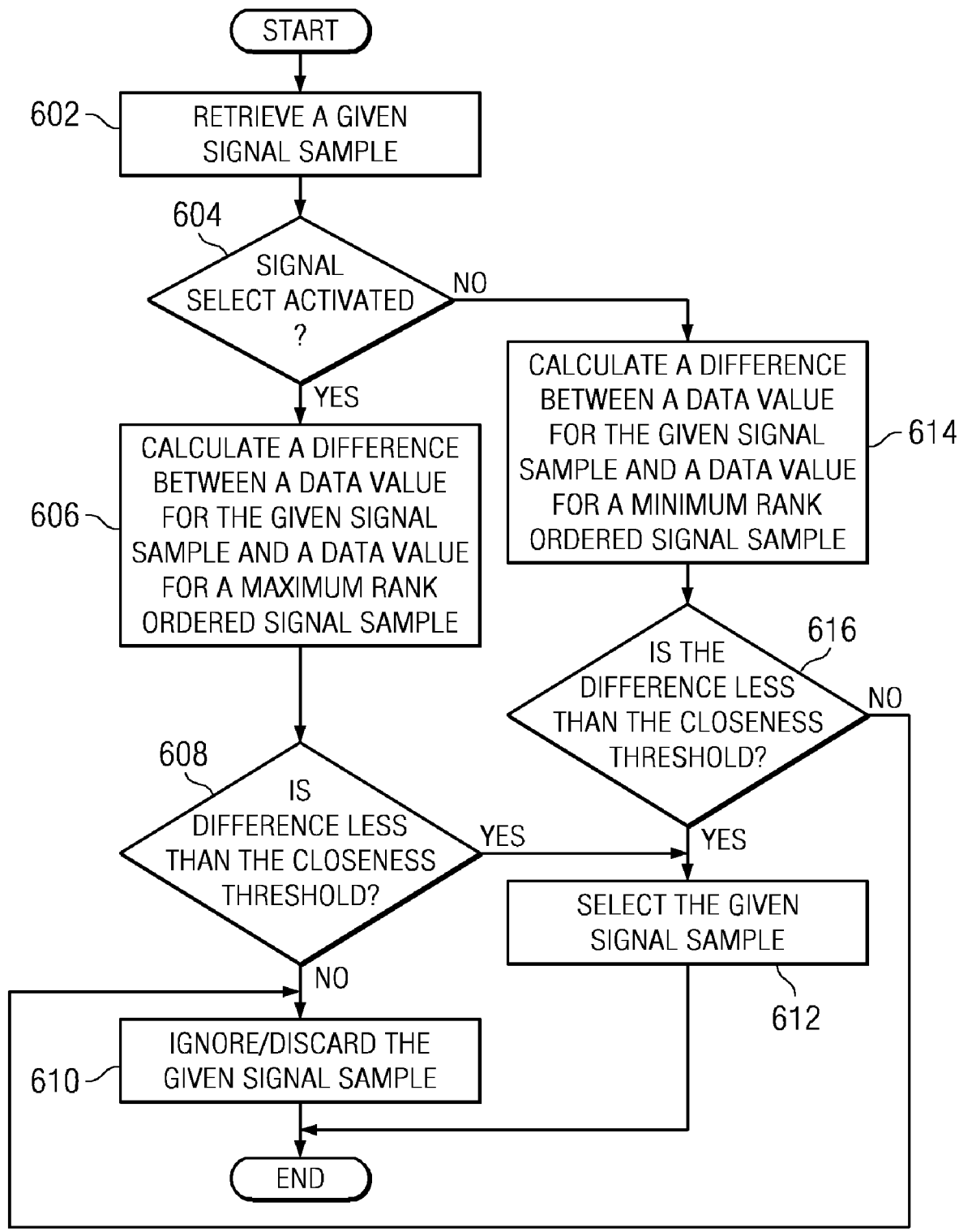
FIG. 6 is a flowchart of a process for utilizing rank order filtering and a closeness threshold to select signal samples for averaging in accordance with an advantageous embodiment.

FIG. 6 is a flowchart of a process for utilizing rank order filtering and a closeness threshold to select signal samples for averaging in accordance with an advantageous embodiment. The different operations shown in FIG. 6 are implemented by a hardware or software component, such as, smart averaging filter 310 in FIG. 3 and smart averaging filter 400 in FIG. 4.

The process begins by retrieving a given signal sample (operation 602). A determination is made as to whether a signal selection function is activated (operation 604). If the signal selection function is activated, a difference between a data value for the given signal sample and a data value for a maximum rank ordered signal sample is determined (operation 606). A determination is made as to whether the difference is less than the closeness threshold (operation 608). If the difference is not less than the closeness threshold, the signal sample is ignored or discarded (operation 610) with the process terminating thereafter. In other words, the signal sample is not included in the subset of selected signal samples that will be averaged. However, if the difference is less than the closeness threshold, the signal sample is selected (operation 612) for addition to the selected subset of signal samples with the process terminating thereafter.

Returning now to operation 604, if a signal select is not activated, a noise ignore feature is activated. The noise ignore feature calculates a difference between a data value for the given signal sample and a data value for a minimum amplitude rank ordered signal sample (operation 614). A determination is made as to whether the difference is less than the closeness threshold (operation 616). If the difference is not less than the closeness threshold, the signal sample is ignored or discarded (operation 610). If the difference is less than the closeness threshold, the signal sample is selected (operation 612) for inclusion in the selected subset of signal samples with the process terminating thereafter.

In accordance with another illustrative embodiment, a closeness threshold could also be applied to any of the rank ordered samples depending upon the spatial, temporal and spectral features of wanted signals and unwanted signals. For example, if noise spikes were intermittent "bipolar" amplitudes relative to signals then a centrally ordered sample in a group of N samples and an "intermediate CT" or bipolar closeness threshold applied to a central ordered sample, such as a median or mode sample, would be utilized for smart averaging of ordered samples.

Figure 7:
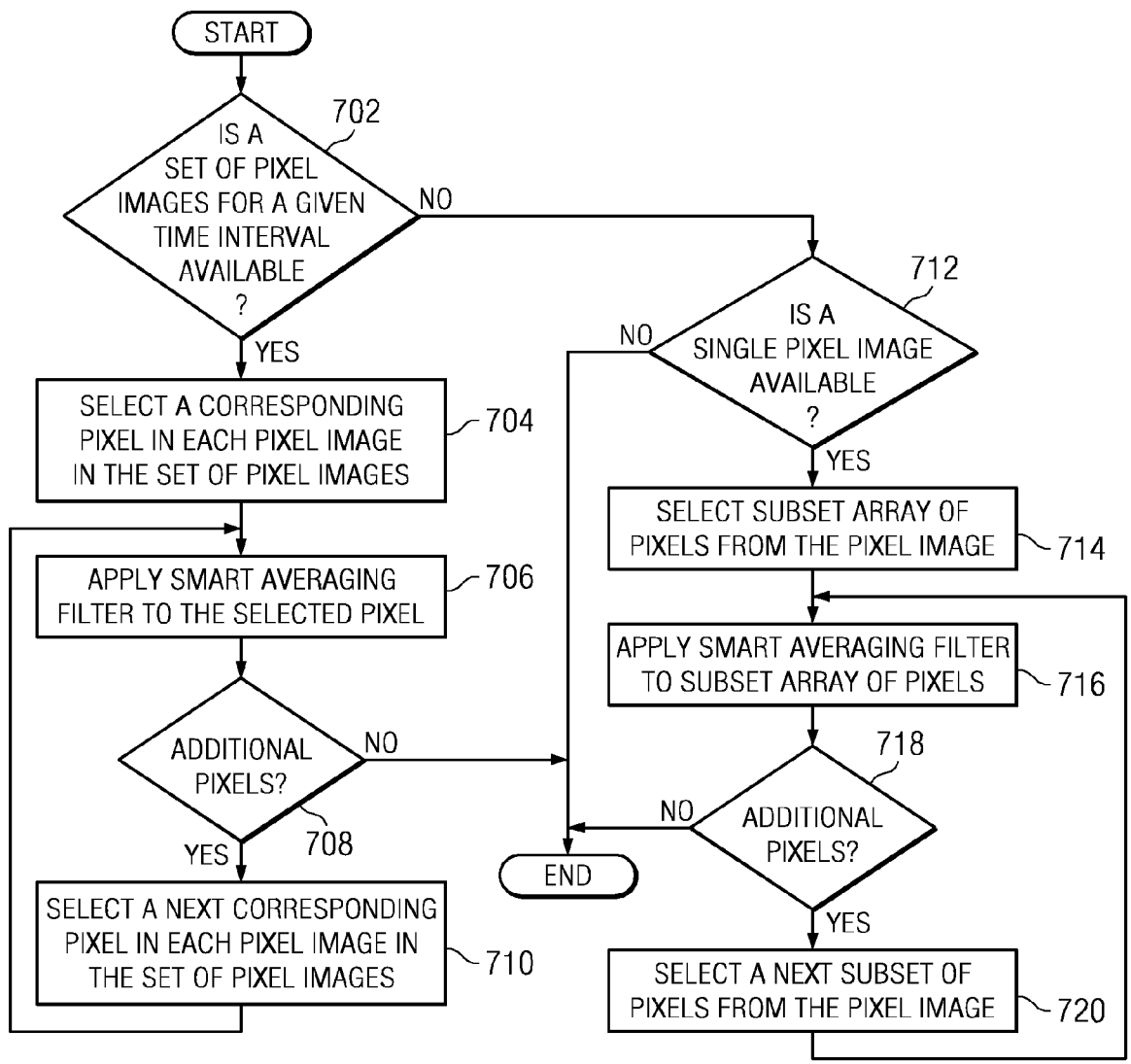
FIG. 7 is a flowchart of a process for utilizing smart signal averaging to enhance a signal-to-noise ratio in pixel images in accordance with an advantageous embodiment.

Referring now to FIG. 7, a flowchart of a process for utilizing smart signal averaging to enhance a signal-to-noise ratio in pixel images is shown in accordance with an advantageous embodiment. The different operations shown in FIG. 5 are implemented by a component, such as smart averaging filter 310 in FIG. 3 and smart averaging filter 400 in FIG. 4.

The process begins by making a determination as to whether a set of consecutive pixel images for a given time interval is available (operation 702). A set of consecutive pixel images includes at least two pixel images. If a set of pixel images is available, a corresponding pixel is selected from each pixel image (operation 704). A corresponding pixel is a pixel at the same pixel location in each pixel image. In other words, a given pixel is selected from each pixel image in the set of pixel images to form a set of signal data values. The given pixel selected from each pixel image is a pixel corresponding to a same pixel location in each pixel image.

Smart averaging filter is applied to the selected pixels (operation 706). In other words, the selected pixels form a set of signal data values that are rank ordered and compared to a closeness threshold to select a subset of data values for averaging.

The process makes a determination as to whether additional unprocessed pixels remain in the set of pixel images (operation 708). If no additional pixels remain, the process terminates thereafter. However, if additional unprocessed pixels do remain, a next corresponding pixel is selected from each pixel image in the set of pixel images to form a next set of signal data values (operation 710). The smart averaging filter is applied to rank order the pixel data values, compare the pixel data values to a closeness threshold, and select a subset of data values for averaging. Operations 706-710 are repeated iteratively until all pixels in the set of pixel images have been processed, with the process terminating thereafter. The output of the smart averaging filter is an averaged pixel data value for each corresponding pixel in the set of pixels. The averaged pixel data values form a new pixel image with an enhanced signal-to-noise ratio.

In this example, only one pixel is selected from each pixel image for application of the smart averaging filter. However, any number of corresponding pixels could be selected from each pixel image for application of the smart averaging filter during any given iterative loop through operations 706-710.

Returning now to operation 702, if a set of two or more pixel images is not available, a determination is made as to whether a single pixel image is available (operation 712). If a single image is not available, the process terminates thereafter.

If a single pixel image is available, a subset array of pixels is selected from the single pixel image (operation 714). The pixel image includes an array of pixels. The subset array of pixels is a subset of the pixels in the pixel image array. The subset of pixels from the pixel image is a set of signal data values to be processed in a signal averaging filter.

The smart averaging filter is applied to the subset of pixels (operation 716). A determination is made as to whether additional unprocessed pixels remain (operation 718). If additional pixels remain, a next subset of pixels from the pixel image is selected to form a next set of signal data values (operation 720). Operations 716-720 are repeated iteratively until all pixels in the pixel image have been processed, with the process terminating thereafter. The output of the smart averaging filter is an averaged pixel data value for each subset of pixel signal data values for the pixel image. The averaged pixel data values form a new pixel image with an enhanced signal-to-noise ratio.

Figure 8:
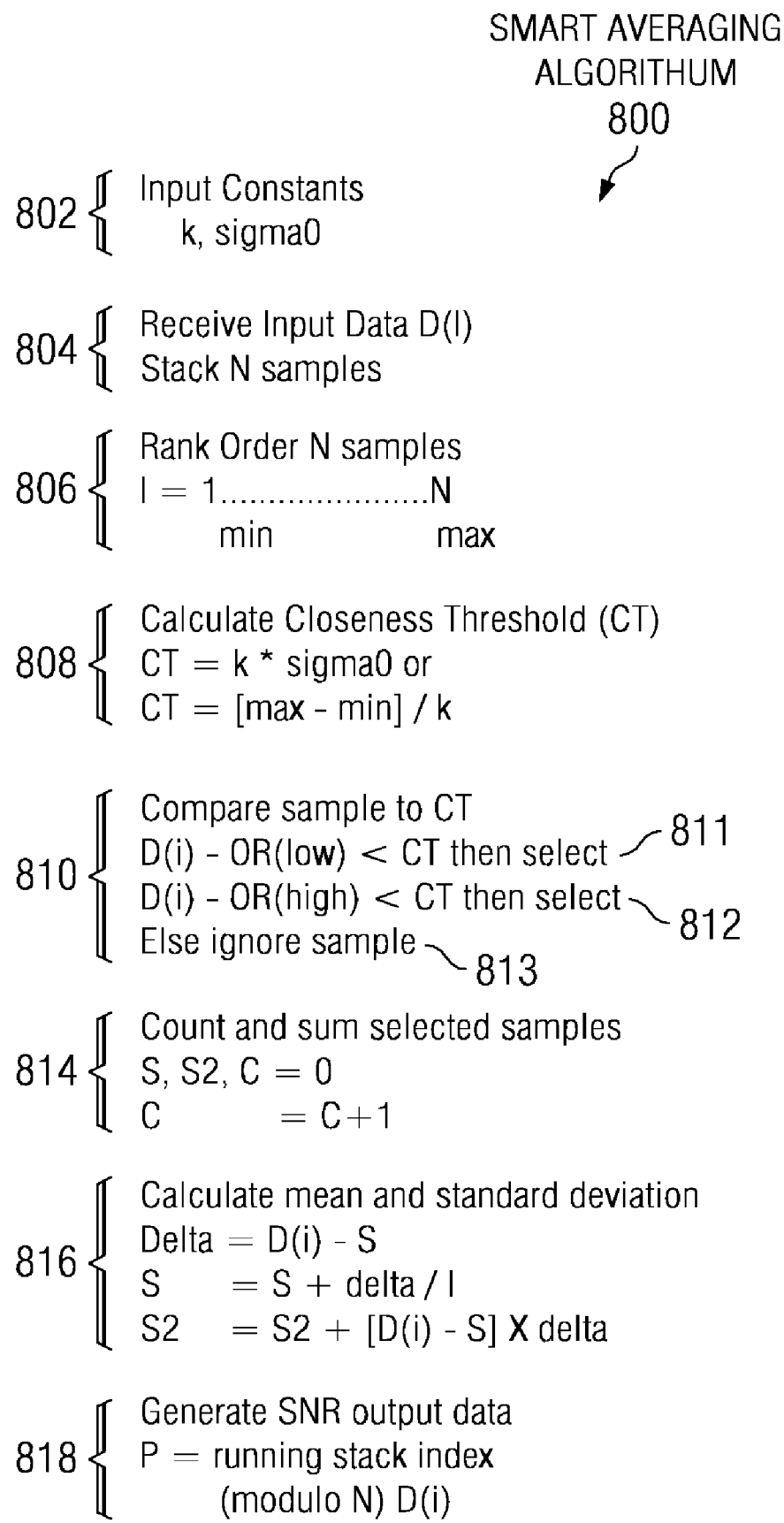
FIG. 8 is a smart averaging algorithm in accordance with an advantageous embodiment.

FIG. 8 is an illustration of pseudo code for a smart averaging algorithm in accordance with an advantageous embodiment. Smart averaging algorithm 800 can be implemented in smart averaging filter 310 in FIG. 3 or smart averaging filter 400 in FIG. 4. Code 800 is pseudo code that depicts smart averaging. Section 802 is input constants for the algorithm. Input constant k is a user input integer value. Input constant sigma0 is a variance for a set of input signal samples.

At section 804, the algorithm receives an input data stream. The input data is placed in a data stack as a set of "N" signal samples. The set of "N" samples are ordered into groups of "N" samples at section 806.

The algorithm calculates a closeness threshold at section 808. A closeness threshold can be calculated by multiplying a user input integer k by the variance sigma0. The closeness threshold can also be determined by dividing a difference between a maximum signal sample value and a minimum signal sample value by the user input constant k.

The algorithm compares each signal sample in the set of signal samples to the closeness threshold. At line 811, a difference between a data value and a minimum ordered data value from the ordered set of "N" data values is compared to the closeness threshold at section 810. If the difference is less than the closeness threshold, the signal sample is selected. At line 812, a difference between a data value and a maximum ordered data value from the ordered set of "N" data values is compared to the closeness threshold. If the difference is less than the closeness threshold, the signal sample is selected. If the signal sample data value is not less than the closeness threshold at line 811 or 812, the signal sample is discarded or ignored at line 813.

The algorithm counts the number of signal samples selected and sums the data values for the subset of selected signal samples at section 814. The algorithm calculates a mean (average) and a standard deviation for the selected subset of signal samples at section 816. The algorithm generates an output at section 818. The output includes signal-to-noise ratio output data.

This smart averaging algorithm ignores non-signal noise and clutter or interference samples in the averaging process. In other words, samples contaminated by noise and clutter are excluded or removed from the subset of samples that are averaged to obtain the new, averaged, signal data value.

Figure 9:
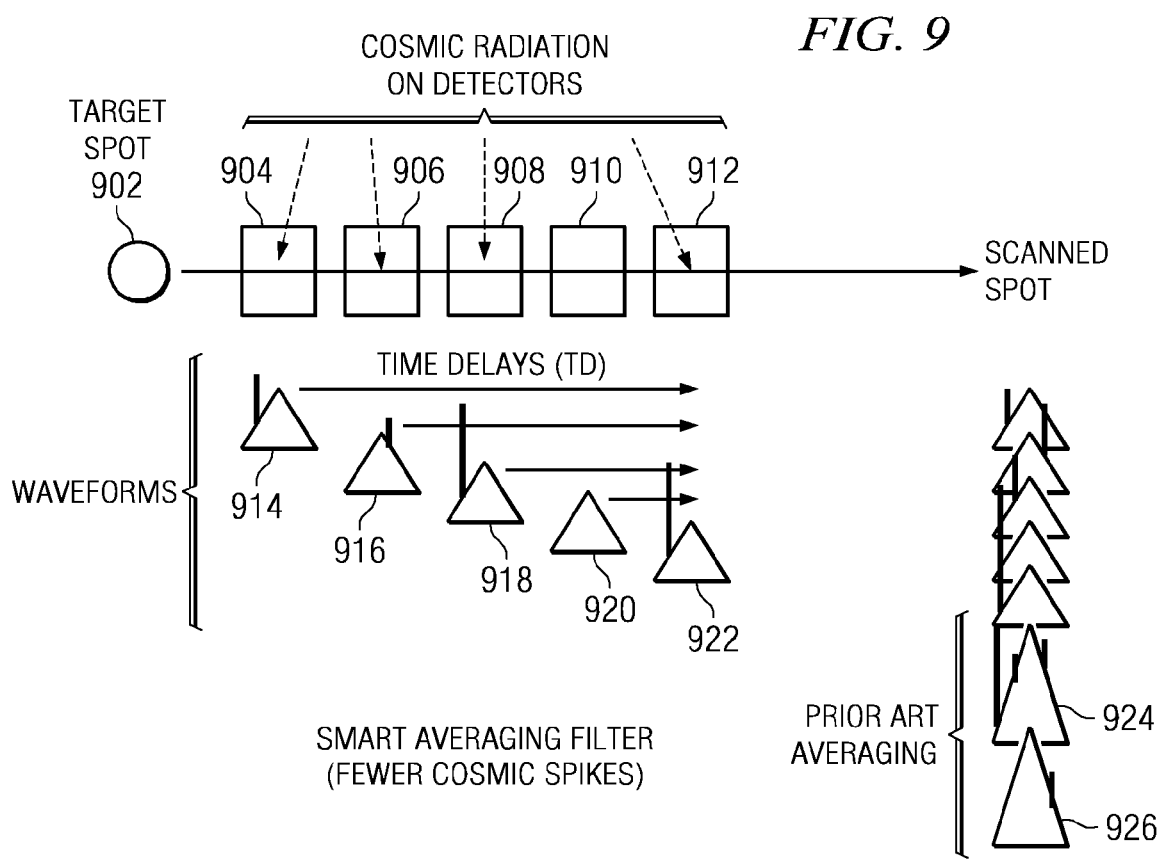
FIG. 9 is an illustration of a noise ignore option for filtering positive cosmic radiation induced noise spikes in a five detector group in a smart signal averaging process in accordance with an advantageous embodiment.

Turning now to FIG. 9, an illustration of a noise ignore option for filtering positive cosmic radiation induced noise spikes in a five detector group in a smart signal averaging process is depicted in accordance with an advantageous embodiment. The example in FIG. 9 is an exemplary implementation of the system shown in FIG. 3.

Target spot 902 is scanned by a set of detectors, including detectors 904-912. Detectors 904-912 are detectors such as detector system 114 in FIG. 1. In this illustrative example, detectors 904-912 are scanning infrared sensors exposed to a radiation environment that induces intermittent noise spikes in the output of 5 detectors 904-912.

Detectors 904-912 register or capture sample signals 914-922 in parallel. Sample signals 914-922 contain spiky (non-stationary) noise contamination. Prior art signal averager aligns and sums (integrates) signals 914-922 registered by detectors 904-912 as the target spot transits detectors 904-912. The result is averaged signal 924 in which the target signal data value is obscured by spiky noise signals.

The smart averaging filter ranks sample signals 914-922 and selects a minimum ranked sample because it is least likely to be contaminated by positive radiation induced spikes. The smart averaging filter compares the ranked signal samples 914-922 with a closeness threshold. The closeness threshold may be calculated based on the statistical properties of the non radiation induced noise samples. The smart averaging algorithm ignores positive amplitude noise spikes and averages non-spiky noise samples to produce average signal 926. Average signal 926 has an enhanced signal-to-noise ratio over prior art averaged signal 924. In other words, spiky noise may be less evident or absent in smart averaged signal 926 enabling a user to more easily identify target signal data.

A benefit of the smart averaging algorithm is that when the spiky noise environment subsides, the smart averaging algorithm accepts all five signal samples from the five detectors by selecting a closeness threshold that captures the non spiky detector noise. A closeness threshold of approximately four (4) standard deviations of the non spiky noise samples applied to the minimum of five ordered sample will capture most of the non spiky noise samples. In this manner, the smart averaging algorithm reverts to a conventional averaging mechanism that averages all signal samples, rather than only a subset of selected signal samples. This conventional averaging mechanism is optimal in stationary noise, but sub-optimal in non-stationary noise environments, such as high amplitude intermittent spike noise, as in this example.

Figure 10:
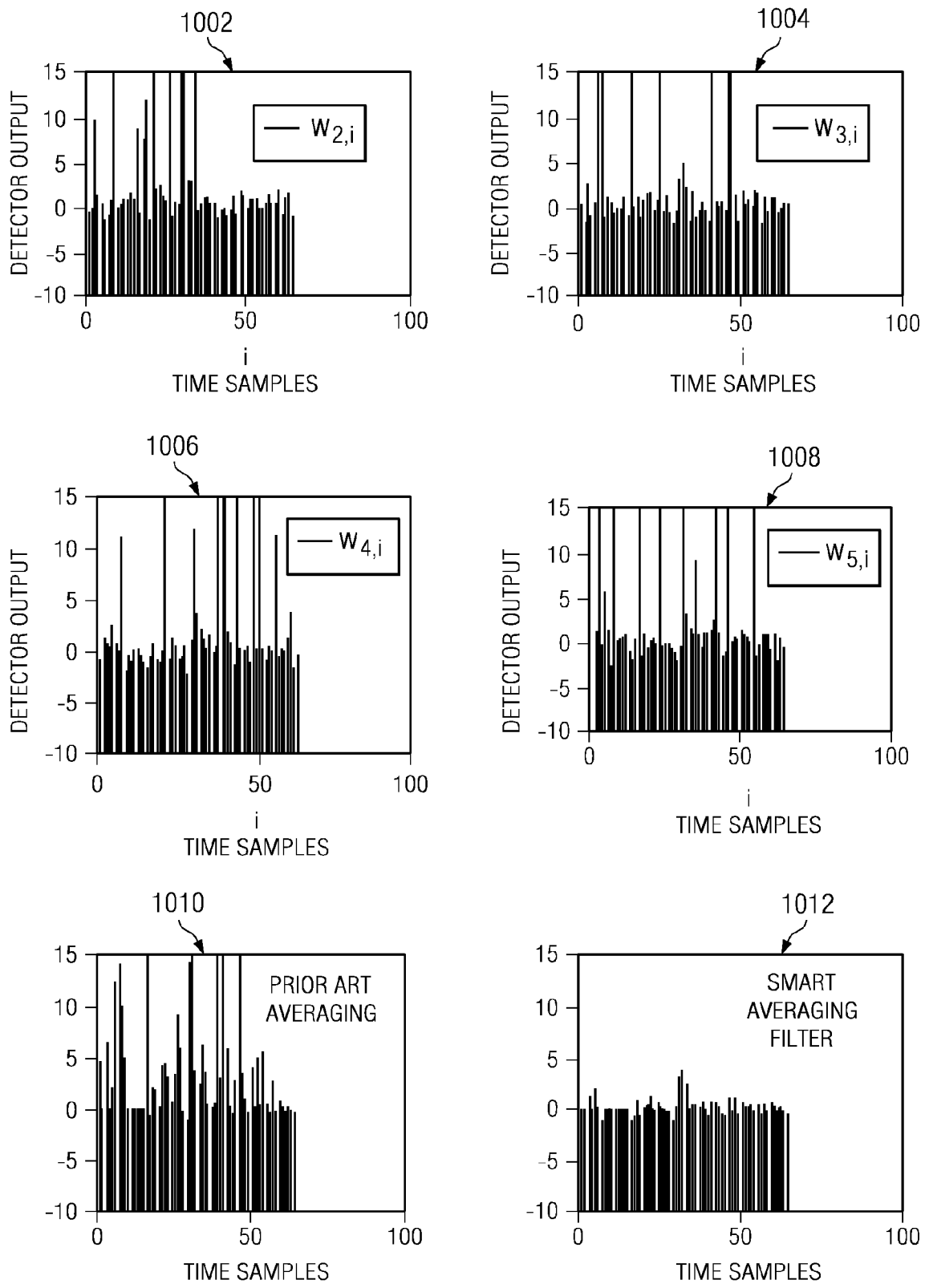
FIG. 10 is an illustration of a set of signal data values captured by a set of signal detectors in accordance with an advantageous embodiment and an averaged signal data value in accordance with prior art averaging and an averaged signal data value in accordance with an advantageous embodiment.

FIG. 10 is an illustration of a set of signal data values captured by a set of signal detectors and averaged in accordance with an advantageous embodiment. In FIG. 10, the set of signal data values are averaged in accordance with the smart averaging technique of an advantageous embodiment and compared with an averaged signal data value obtained in accordance with prior art averaging.

Set of detectors are signal detectors, such as detectors 904-912 of FIG. 9. As used herein, a set of signal detectors can be a single signal detector, as well as two or more signal detectors. Waveforms 1002, 1004, 1006, and 1008 are sets of signal values captured by the set of signal detectors. Each of waveforms 1002-1008 is a set of samples that includes sixty-four (64) signal data values. Waveforms 1002-1008 are contaminated by non-stationary, intermittent, spiky noise. The non-stationary spiky noise is obscuring a target signal data value. In this example, the target signal data value is located approximately in the center of the sixty-four samples, or approximately at sample thirty-two (32).

Prior art averaged waveform 1010 shown in the lower left corner of the figure is an averaged signal data value generated by a prior art signal averaging method. Prior art averaged waveform 1010 is contaminated by high amplitude, spiky noise which is obscuring a target data value located at around sample thirty-two.

Smart averaged signal waveform 1012, shown in the lower right corner of FIG. 10, is an averaged signal data value generated by a smart averaging method in accordance with an advantageous embodiment. Smart averaged signal waveform 1012 has an enhanced signal-to-noise ratio. The target signal in averaged signal 1012 is less obscured by spiky noise. Thus, smart averaged signal waveform 1012 enables a user to more easily identify target data values, such as the target data value located approximately at sample thirty-two in this example.

Figure 11:
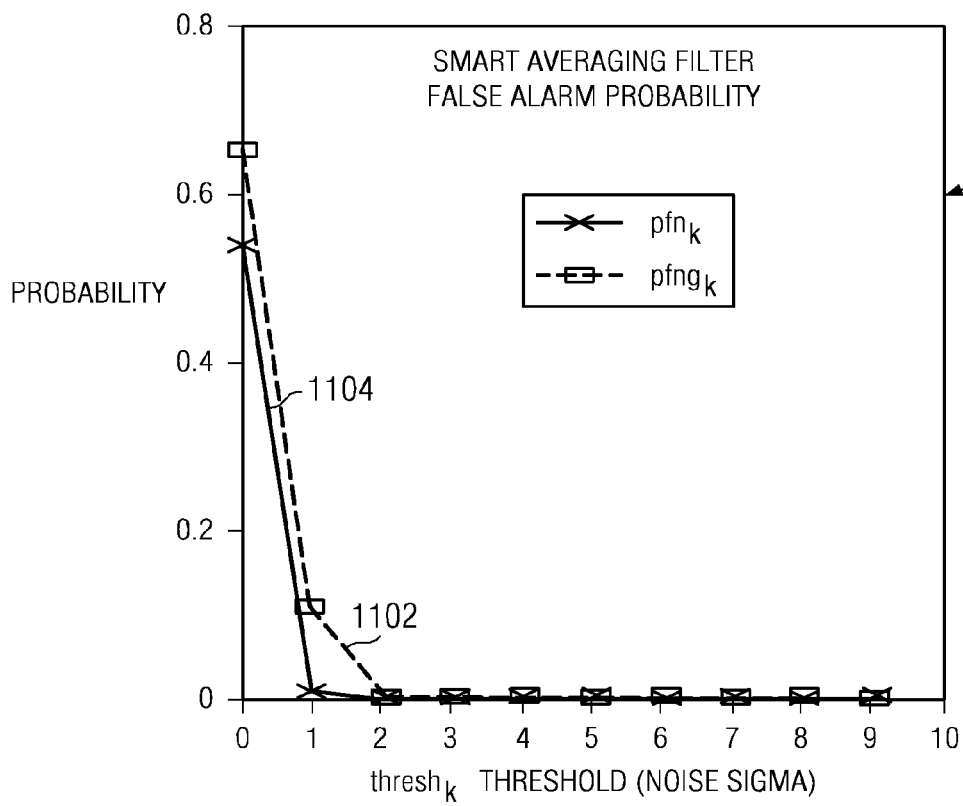
FIG. 11 is a graph illustrating a false alarm probability during an exemplary smart signal averaging process in accordance with an advantageous embodiment.

Referring now to FIG. 11, an illustration of a false alarm probability during an exemplary smart signal averaging process is shown in accordance with an advantageous embodiment. A false alarm probability is a fraction of forecast events that were observed to be non-events or erroneous target detection caused by noise or interfering signals. Probability of false detection (Pf) is an important signal metric for measuring signal quality.

The probability of false detection (Pf) may be measured as ratios of threshold exceedances or hits compared to a total number of samples in stable noise environments and unstable noise environments. A stable noise environment is an environment in which noise may be produced by the detection device. This noise is stationary or predictable. An unstable noise environment is one in which noise may be produced by non-stationary noise sources, such as gamma noise.

In graph 1100, a false alarm probability for a non-stationary noise environment 1102 and stationary noise environment 1104 is shown for a smart averaging filter.

Figure 12:
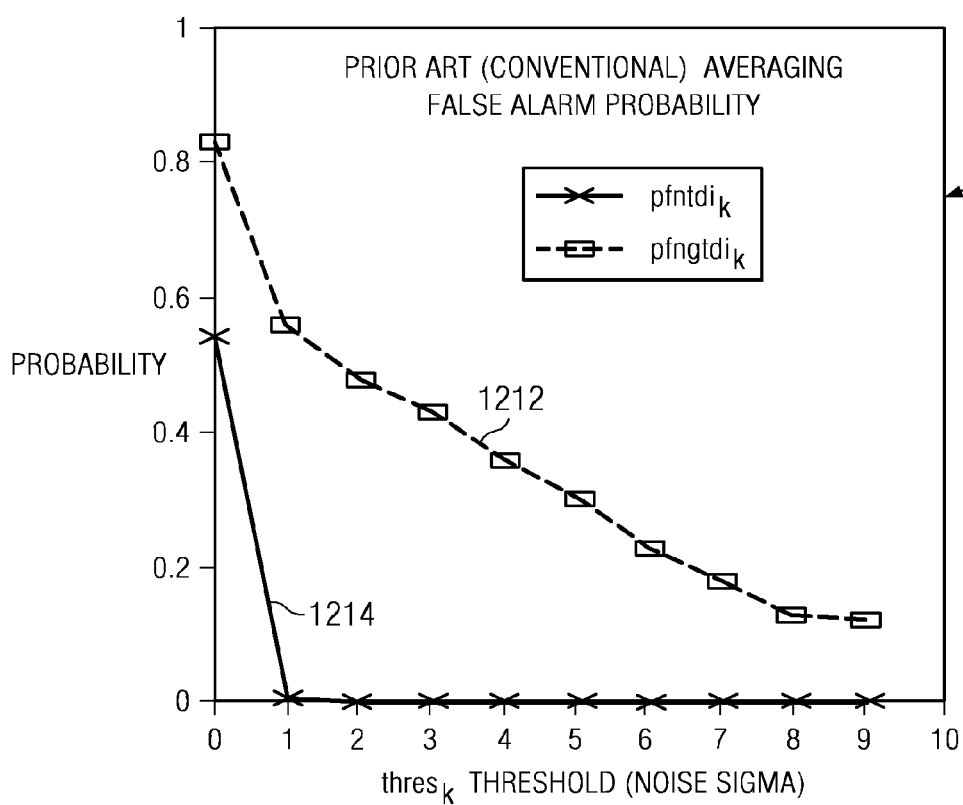
FIG. 12 is a graph illustrating a false alarm probability during a conventional (prior art) signal averaging process.

FIG. 12 is an illustration of a false alarm probability during a conventional (prior art) signal averaging process. In graph 1210, a false alarm probability for a prior art (conventional) averaging filter is shown in a non-stationary, spiky noise environment at line 1212 and a stationary noise environment at line 1214.

In a comparison of the waveform generated by a smart averaging procedure of an advantageous embodiment shown in FIG. 11 and the waveform generated by a conventional (prior art) averaging procedure in FIG. 12, it can be seen that in a stationary noise environment, the smart averaging filter has an equivalent false detection rate shown by line 1104 in FIG. 11 as the conventional averaging filter shown at line 1214 in FIG. 12. In other words, smart averaging results shown at line 1104 in FIG. 11 are comparable to conventional averaging results shown in line 1214 in FIG. 12 when cosmic induced noise spikes are absent.

However, in a spiky, non-stationary noise environment, the smart averaging filter essentially quenches or eliminates false signal detection at a threshold of 3, as can be seen in line 1104 of FIG. 11. However, the prior art (conventional) averaging filter still has a forty percent (40%) probability of false target detections at a threshold of 3, as shown in line 1214 in FIG. 12.

In other words, the dotted curved line 1102 in FIG. 11 illustrating false alarm probability for smart averaging filter is significantly reduced, illustrating fewer false alarms as compared to the corresponding dotted curve line 1212 in FIG. 12 for conventional (prior art) averaging in which all signal data values are averaged.

Figure 13:
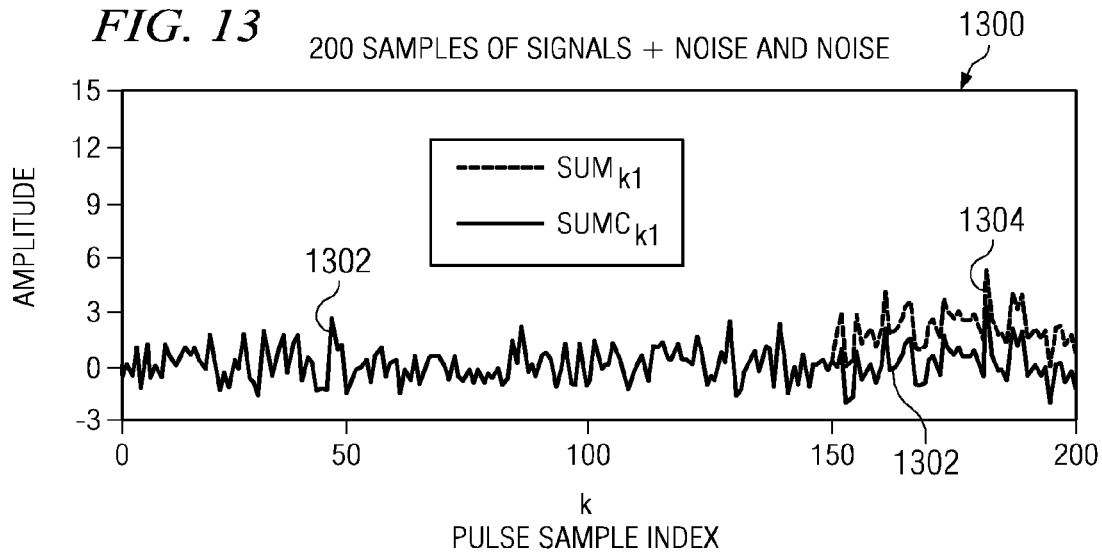
FIG. 13 is a graph illustrating a clumped target signal in a laser radar embodiment where pointing instabilities cause signal absence in a portion of the signal samples in accordance with an advantageous embodiment.

Turning now to FIG. 13, a graph illustrating a clumped target signal in a laser radar embodiment where pointing instabilities cause signal absence in a portion of the signal samples is shown in accordance with an advantageous embodiment. This laser radar embodiment is an application involving simulated laser returns in the presence of a beam offset which causes a continuous seventy-five percent (75%) signal outage in bursts of two-hundred (200) pulses. A clumped target signal, shown in the upper right samples in the 150 to 200 sample index range, has occurred in this example because pointing instabilities cause signal absence in samples 1 to 150.

Graph 1300 is a graph of sample signal record for the two-hundred pulses. Due to the seventy-five percent outage, the signal lines 1302 and 1304 are clumped in the 150-200 sample index range at the end of the record. This scenario might arise from a damaged laser fire control pointer that is off bore sight seventy percent (70%) of the time. Thus, samples at index 1 to 150 are noise signal samples. In accordance with the smart averaging technique of the illustrative embodiments, the noise signal samples can be ignored or discarded. The signal samples from 150 to 200 can be selected for averaging in order to obtain an average signal sample with minimum noise interference or an absence of noise obscuring the target signal.

Figure 14:
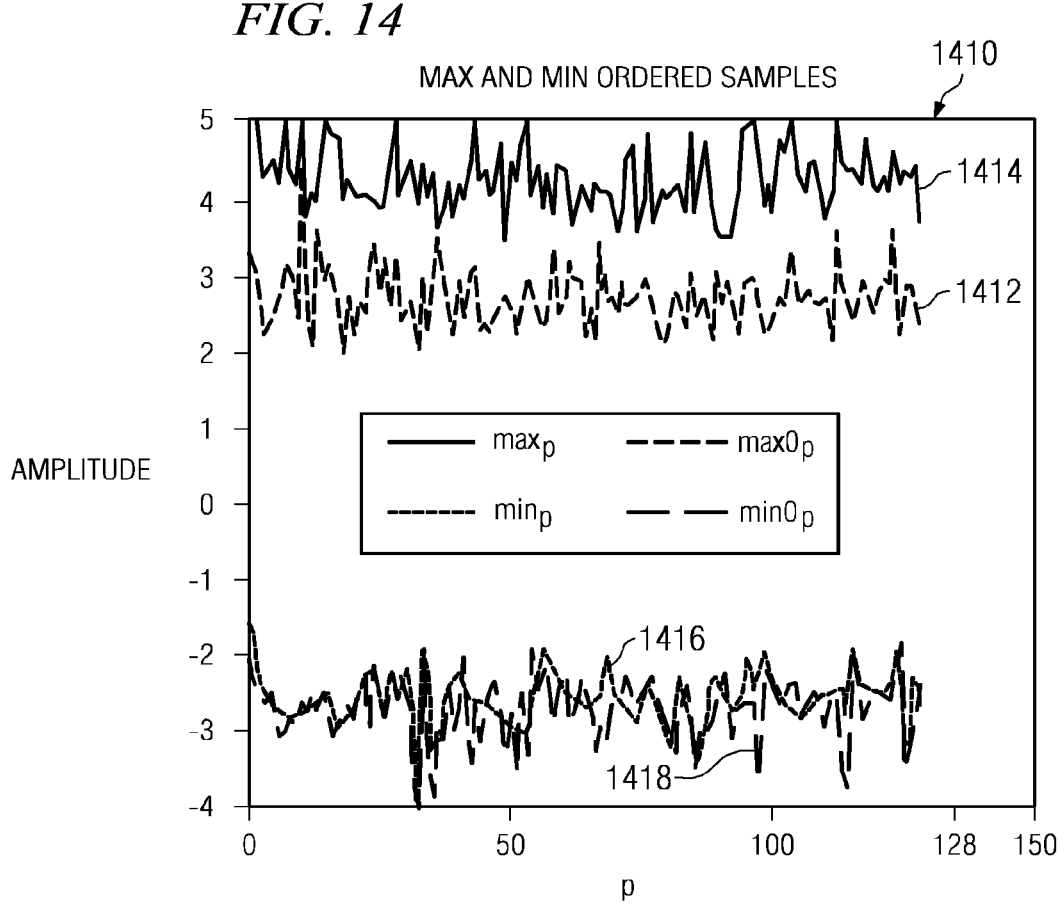
FIG. 14 is a graph illustrating a maximum (MAX) and a minimum (MIN) ordered data value for noise only and signal+noise data conditions in a signal select option of a smart signal averaging process in accordance with an advantageous embodiment.

Referring now to FIG. 14, a graph illustrating a maximum (MAX) and a minimum (MIN) ordered data value for noise only and signal+noise data conditions in a signal select option of a smart signal averaging process is depicted in accordance with an advantageous embodiment.

Graph 1410 shows four (4) ordered signals. The signals are minimum 1412 and maximum 1414 for noise only and maximum 1416 and minimum 1418 for signal plus noise waveforms obtained over one-hundred and twenty-eight (128) trials. These maximum and minimum data values are used to calculate a closeness threshold based on the ordered data values. The closeness threshold is calculated by multiplying a difference between a maximum data value and a minimum data value by q, wherein q ranges from 1 to 16. The total is then divided by 16. In other words, the closeness threshold can be determined by using the formula [MAX−MIN]*q/16. In this manner, sixteen (16) different closeness thresholds can be calculated. A best or optimal value for the closeness threshold can be determined based on performance metrics for the set of signal data values using each closeness threshold value.

Figure 15:
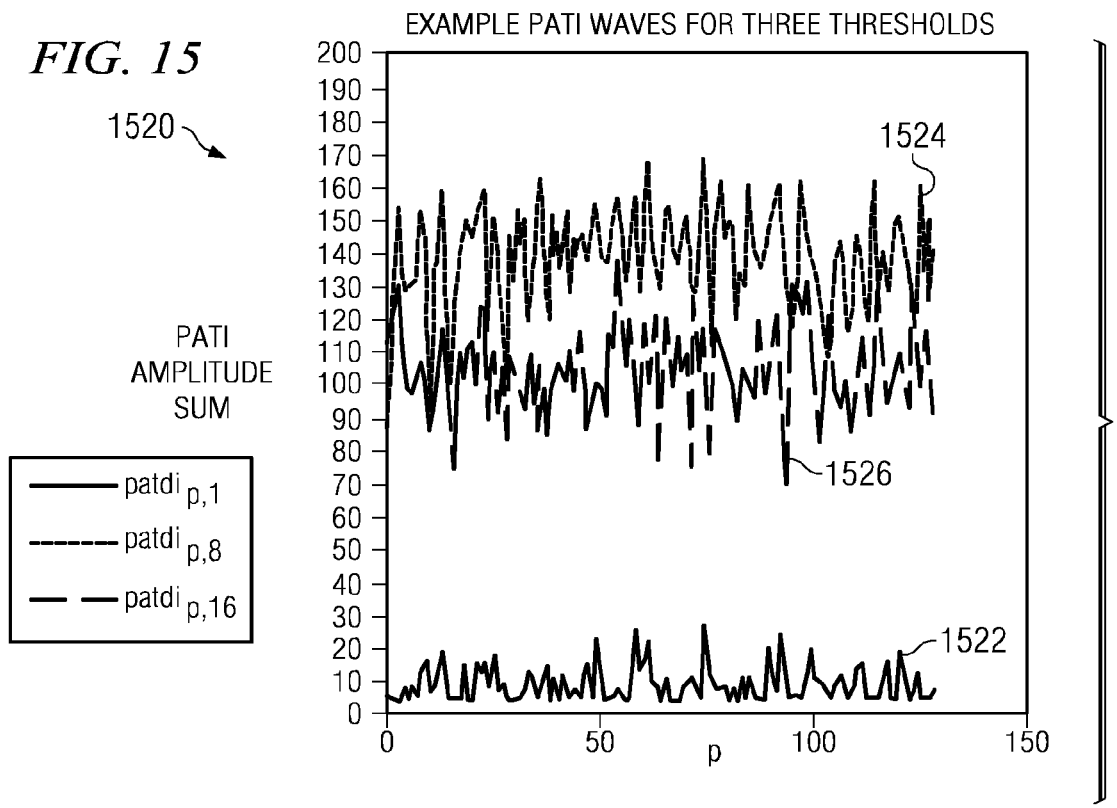
FIG. 15 is an illustration of statistics for a signal select option in a smart signal averaging process in accordance with an advantageous embodiment.

FIG. 15 is an illustration of statistics for a signal select option in a smart signal averaging process in accordance with an advantageous embodiment. Graph 1520 shows the pointing adaptive averaged laser data values from the example in FIG. 13 in which the data values have been averaged in accordance with the smart averaging process where the closeness threshold value has been set at 1, 8 and 16 (full scale) of the data values for a 128 trial Monte Carlo experiment.

In other words, graph 1520 shows an output averaged waveform obtained utilizing three (3) of the possible sixteen (16) closeness threshold values for smart signal averaging in accordance with an advantageous embodiment. The output waveforms can be compared to determine which closeness threshold value is the optimum or best closeness threshold value for selecting signal data values for smart averaging.

Line 1522 shows a closeness threshold where a value for the variable q is equal to one (1). In other words, the closeness threshold is calculated as [MAX−MIN]*1/16. Line 1524 shows a closeness threshold where q is equal to eight (8). In other words, the closeness threshold is calculated as [MAX−MIN]*8/16. Line 1526 shows a closeness threshold where q is equal to sixteen (16). In other words, the closeness threshold is calculated as [MAX−MIN]*16/16. Line 1526 where q is equal to sixteen (16) all data values are averaged and no signal data values are ignored or discarded. In other words, in this example, the closeness threshold forces the smart averaging filter to operate like a conventional signal averaging filter in which all signal samples are averaged, rather than only averaging a selected subset of signal samples.

Figure 16:
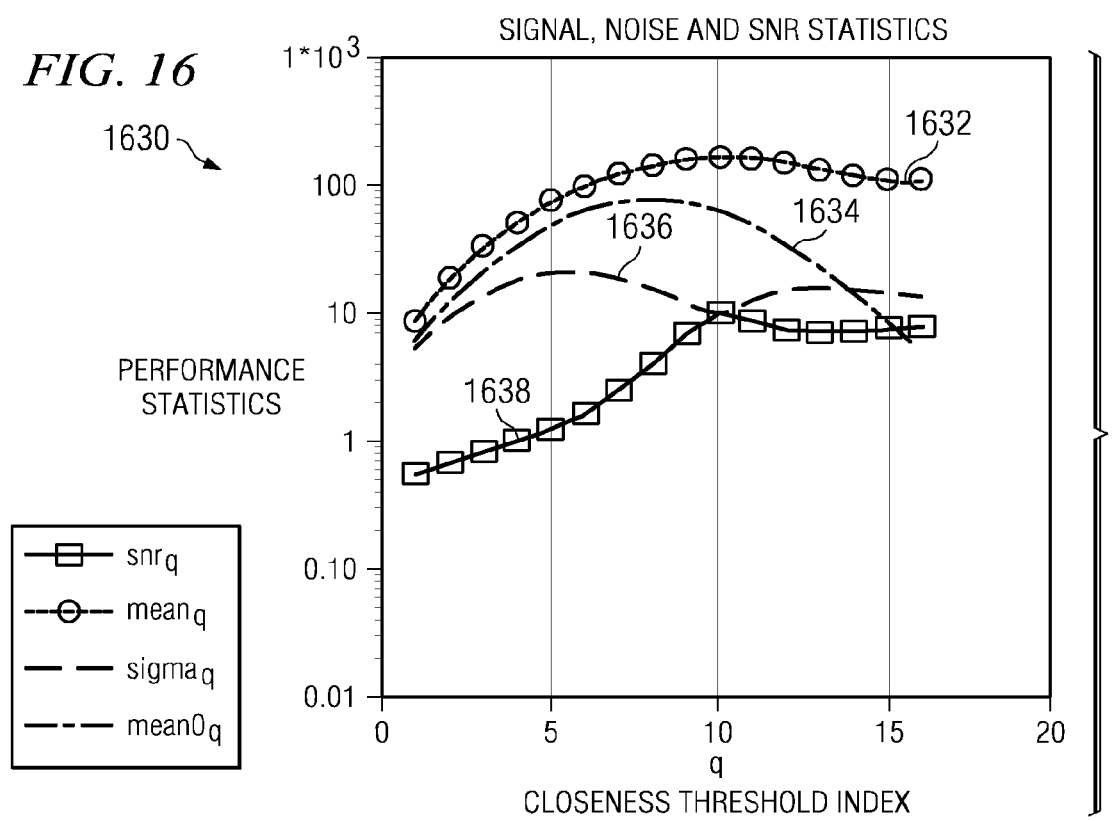
FIG. 16 is an illustration of statistics for a signal select option in a smart signal averaging process with clumped target signal data in accordance with an advantageous embodiment.

FIG. 16 is an illustration of statistics for a signal select option in a smart signal averaging process with clumped target signal data in accordance with an advantageous embodiment. Graph 1630 shows the pointing adaptive averaged laser data values from the example in FIG. 13 in which the signal-to-noise ratio (box curves) is calculated as a function of the closeness threshold setting from 1 to 16. The closeness threshold value of 16 is a full scale averaging in which every signal sample is averaged and none of the signal samples are ignored or discarded.

Graph 1630 illustrates a performance metric for the set of signal samples utilizing the sixteen different closeness thresholds. Line 1632 is a mean or average data value for signal and noise. Line 1634 is a standard deviation for the set of signal samples. Line 1636 is the mean or average for noise signals only. Line 1638 is the signal-to-noise ratio at each closeness threshold "q" value.

Referring to line 1638, the signal-to-noise ratio is small (less than one) when the closeness threshold "q" value is one (1). The signal-to-noise ratio gradually increases to a maximum of approximately ten (10) at closeness threshold "q" value of 10. This is the point at which target signal strength is at its greatest in relation to noise signals. The signal-to-noise ratio slowly decreases to a floor of approximately 7.4 at a "q" value of 16. The "q" value of 16 corresponds to a conventional summer in which all data values are summed to form the average signal value and no data values are excluded. Thus, the maximum signal-to-noise ratio occurs at a closeness threshold "q" value of seven (7) and eight (8). The minimum standard deviation, shown by line 1636, occurs at a "q" value of nine (9) and ten (10).

In this manner, an optimum closeness threshold value can be determined for use in selecting signal data values for averaging. Thus, graph 1630 demonstrates that the best signal-to-noise ratio occurs at closeness threshold setting of approximately 10. The supporting curves are the calculated data means and standard deviations of the data values for noise and signal+noise data conditions.

Figure 17:
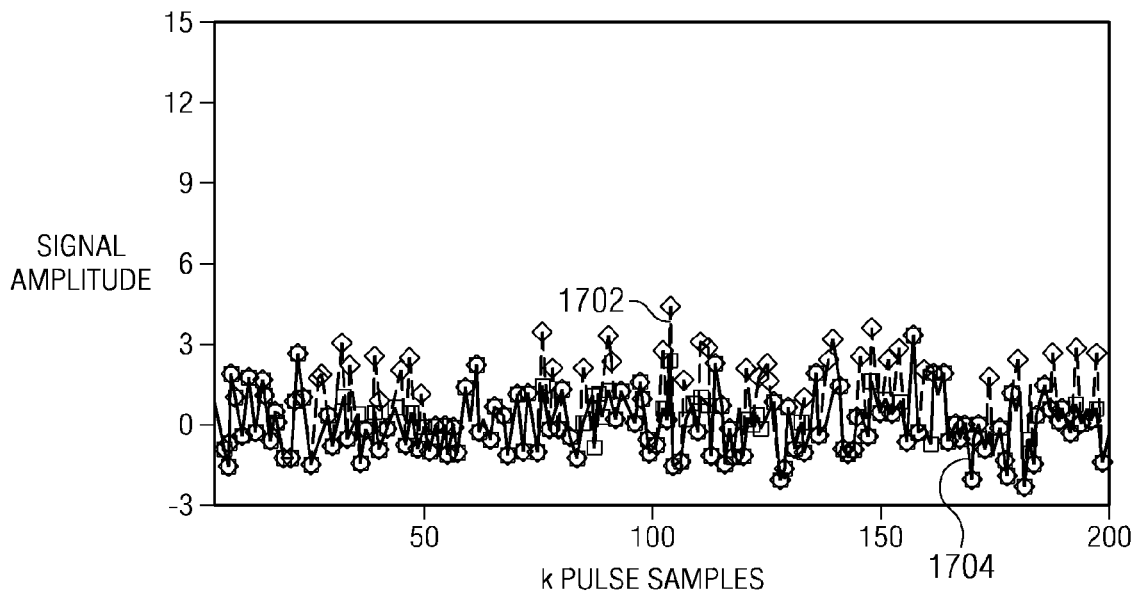
FIG. 17 is a graph illustrating the application of smart averaging to the case of random (non-clumped) laser data values in accordance with an advantageous embodiment.

Turning now to FIG. 17, a graph illustrating the application of smart averaging to the case of random (non-clumped) laser data values is shown in accordance with an advantageous embodiment. In FIG. 17, the smart averaging algorithm is applied in a case of non-clumped random laser signals imbedded in noise. The closeness threshold is determined in a similar manner as in the clumped laser return case shown in FIGS. 13-16, except this case is a more stressing application because of the random, intermittent nature of the laser signal returns due to random jitter.

In this example of laser return data, the signal fluctuations are due to a jittering laser beam in a relation application with a block of 200 samples. This is a more difficult processing scenario because the signals are intermittent. Random signals are shown as a square shaped icon, such as at 1702. In this case, the spikes are now the signals. A signal select option is implemented to sum only the high amplitude laser returns and ignore the low signal returns dominated by noise because the low amplitude signal returns do not contribute to signal growth. Low amplitude noise is shown as an icon with seven points, such as at 1704.

This is an example of utilizing a maximum ordered signal data value plus closeness threshold to select signal data values for smart averaging. The maximum ordered data value is utilized to tag or identify signal spikes and the closeness threshold is used to smooth the device noise. In this manner, the smart averaging process can adapt to compensate for large beam pointing errors by ignoring low amplitude noise signals and average only high amplitude samples containing target data.

The signal-to-noise ratio is determined as a function of closeness threshold settings. However, in this example we have not identified the optimum closeness threshold for this set of sample data.

Figure 18:
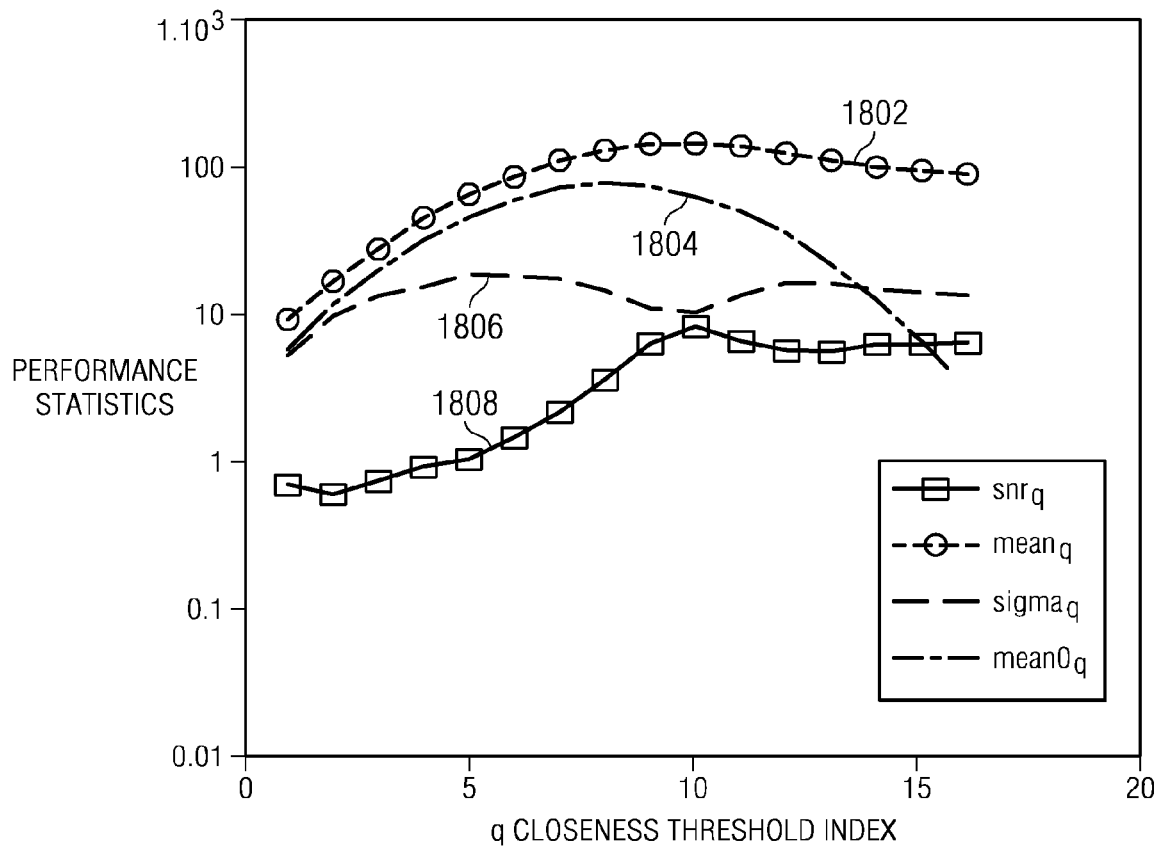
FIG. 18 is a graph illustrating performance statistics for the smart averaging process applied to the random laser data case in accordance with an advantageous embodiment.

FIG. 18 is a graph illustrating performance statistics for the smart averaging process applied to the random laser data case in accordance with an advantageous embodiment. FIG. 18 shows the pointing adaptive averaged laser data values from the example in FIG. 17.

Line 1802 is a mean or average data value for signal and noise. Line 1804 is a standard deviation for the set of signal samples. Line 1806 is the mean or average for noise signals only. Line 1806 is the signal-to-noise ratio at each closeness threshold "q" value.

The signal-to-noise ratio (box curves) 1808 is calculated as a function of the closeness threshold setting from 1 to 16. The closeness threshold value of 16 is a full scale averaging in which every signal sample is averaged and none of the signal samples are ignored or discarded. The signal-to-noise ratio is small (less than one) when the closeness threshold "q" value is one (1). The signal-to-noise ratio gradually increases to a maximum of approximately eight (8) at closeness threshold "q" value of 10. This is the point at which target signal strength is at its greatest in relation to noise signals. The signal-to-noise ratio slowly decreases to a floor of approximately 6.5 at a "q" value of 16. The "q" value of 16 corresponds to a conventional summer in which all data values are summed to form the average signal value and no data values are excluded. Thus, the maximum signal-to-noise ratio occurs at a closeness threshold "q" value of seven ten. The signal-to-noise ration shows an improvement of twenty-three percent (23%) utilizing an "a" value of ten as opposed to a convention (prior art) averaging technique summing all sample data values at a "q" value of 16. The minimum standard deviation, shown by line 1806, occurs at a "q" value of ten (10).

In this manner, an optimum closeness threshold value can be determined for use in selecting signal data values for averaging. In this example, the best signal-to-noise ratio occurs at closeness threshold setting of approximately ten.

The "random laser signal", example in FIGS. 17-18 is more stressing or more difficult to process with conventional averaging algorithms than the "clumped" laser signal example in FIGS. 13-16 it might be possible to slightly improve the signal-to-noise ratio in a clumped signal by using a convention matched filter that is matched to the duration of the clump. However, this matched filter option would not be able to improve a signal-to-noise ratio for a random laser signal sample set because there is no obvious signal duration, but the smart averaging algorithm with rank ordering and closeness thresh holding would in principle have no special difficulties with this case because of its non convolution signal select and data ignore attributes.

Figure 19:
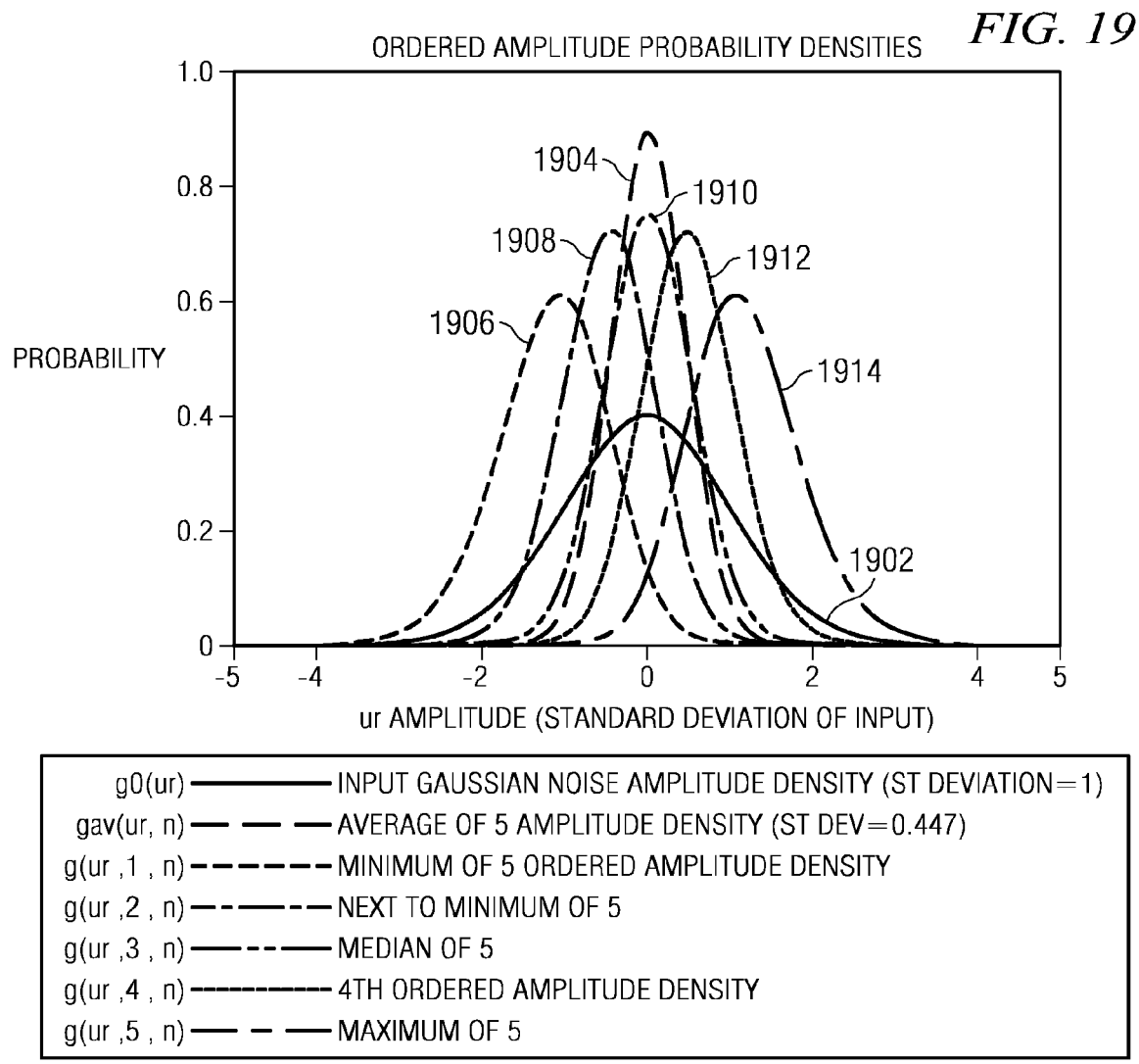
FIG. 19 is an illustration of noise statistic after ordering of five non-spiky, Gaussian detector noise samples with zero mean and unit standard deviation in accordance with an advantageous embodiment.

FIG. 19 is an illustration of noise statistic after ordering of five non-spiky, Gaussian detector noise samples with zero mean and unit standard deviation in accordance with an advantageous embodiment. Line 1902 is an input Gaussian noise amplitude density with a standard deviation of one (1) for the five signal sample. Line 1904 is the conventional average of the five signal samples. The conventional average of the signal samples results in the output standard deviation of 1/sqrt5=0.447 which is higher than the standard deviation (i.e. noise) of any of the ordered samples. Of course, when non Gaussian intermittent noise spikes are included we select a minimum OR=1 rank sample shown at line 1906, because it is least likely to be contaminated by positive radiation induced spikes.

For simple, stationary signal scenarios, the conventional average of five signal samples line 1902 is equal to the smart average obtained by setting the closeness threshold to be maximum ordered sample minus minimum ordered sample (MAX−MIN). This is illustrated by line 1904 which has a standard deviation of 0.447. Thus, when spiky noise is absent, the smart averaging process averages all five samples through the closeness threshold feature applied to the rank ordered sample.

We also include the four (4) standard deviation non spiky noise closeness threshold to enable capture and averaging of the five signal samples to optimally reduce non spiky detector noise when spiky noise subsides. For example, line 1908 is the next to minimum ordered amplitude signal sample of the five samples. Line 1910 is the median or third ordered amplitude signal sample of the five samples. Line 1912 is the fourth ordered amplitude signal sample. Finally, line 1914 is the maximum ordered amplitude signal sample of the five samples.

Figure 20:
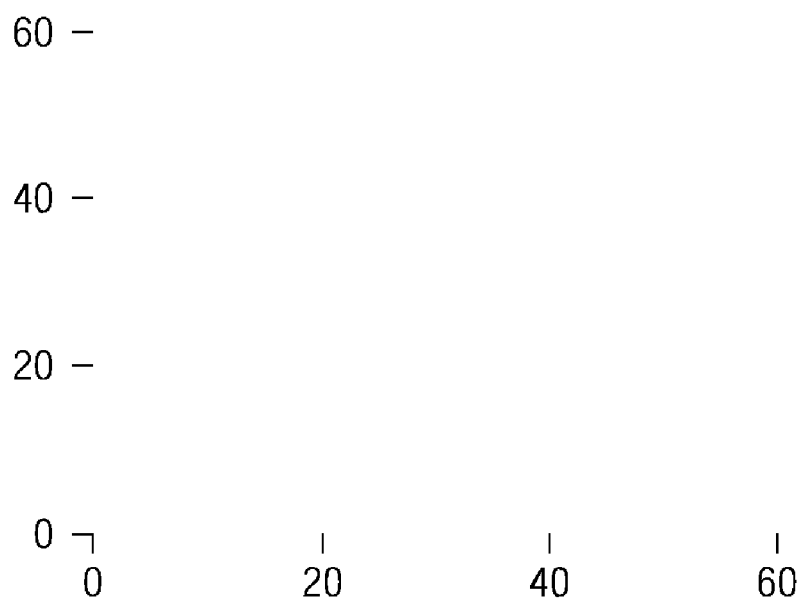
FIG. 20 is a 3×3 spatial pixel filter employing a smart averaging process to ignore positive, intermittent, noise spikes and capture the central pixel target in accordance with an illustrative embodiment.

FIG. 20 is a 3×3 spatial pixel filter employing a smart averaging process to ignore positive, intermittent, noise spikes and capture the central pixel target in accordance with an illustrative embodiment. This is an example of a two-dimensional image processing embodiment, such as is discussed in FIG. 7.

A 3×3 spatial pixel filter employs smart averaging rules to select minimum amplitude sample from the 8 outer ring samples that are within a positive closeness threshold (CT) to ignore positive, intermittent, noise spikes and capture the central pixel target. The image shown in FIG. 20 is a 64×64 pixel image with a target signal in the upper left. This application of the smart averaging filter is a two-dimensional extension of the one (1) dimensional spike suppression application of smart averaging, such as the five (5) detector spiky noise suppression example discussed in FIG. 9.

Figure 21:
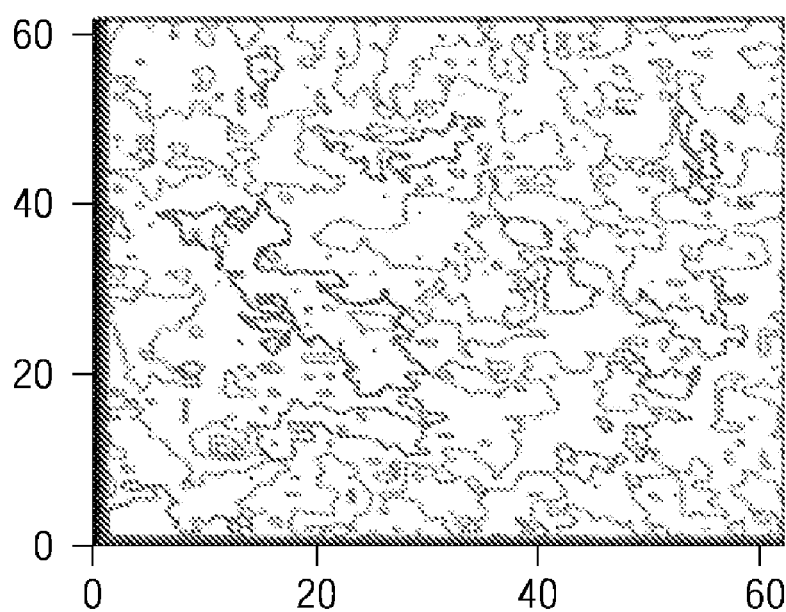
FIG. 21 is a 3×3 spatial blur matched filter employing a prior art averaging process.

FIG. 21 is a 3×3 spatial blur matched filter employing a prior art averaging process. The image shown in FIG. 21 is an image produced by a convention averaging process based on the same pixel image data as in FIG. 20. The image shown in FIG. 21 is a 64×64 pixel image with a target signal also shown in the upper left. The presence of convolved spikes is more apparent in this figure when compared with the image in FIG. 20.

Figure 22:
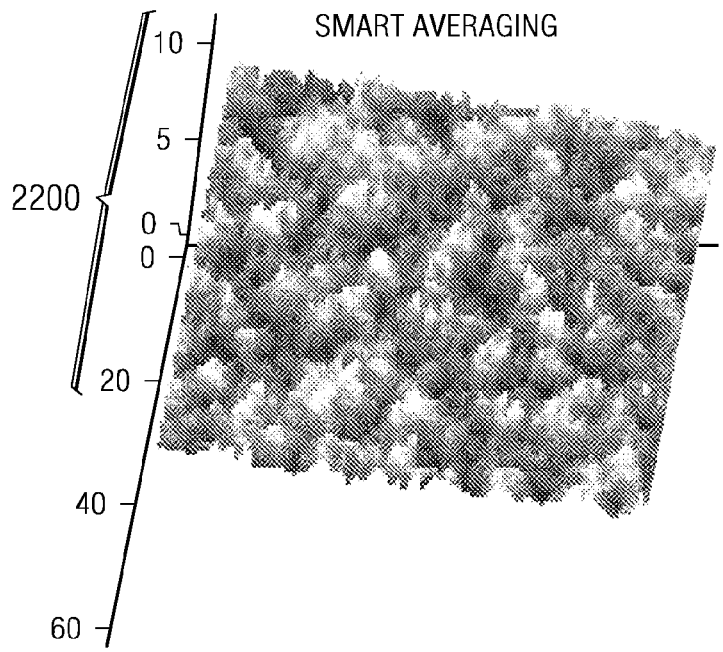
FIG. 22 is a 3×3 spatial pixel filter employing a smart averaging process to ignore positive, intermittent, noise spikes and capture the central pixel target in accordance with an illustrative embodiment.

FIG. 22 is a 3×3 spatial pixel filter employing a smart averaging process to ignore positive, intermittent, noise spikes and capture a central pixel target in accordance with an illustrative embodiment. This is an example of a two-dimensional image processing embodiment, such as is discussed in FIG. 7. In this image, the presence of sharp, spiky noise is not as apparent in the image as compared with the conventionally processed image with the convolved spikes shown in FIG. 23. In other words, application of the smart averaging process of the illustrative embodiments results in enhanced signal-to-noise ratio for the averaged two-dimensional pixel image.

Figure 23:
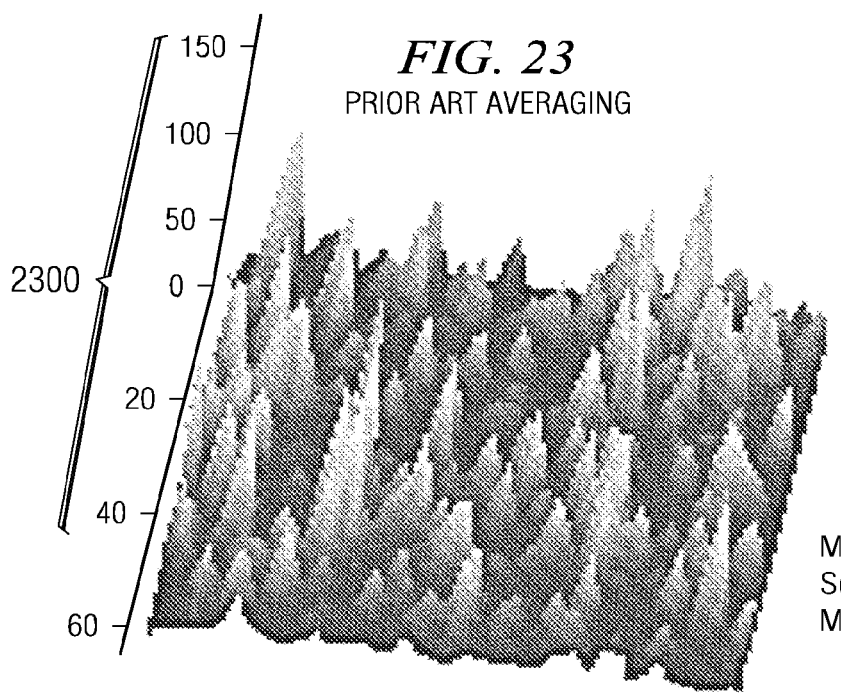
FIG. 23 is a 3×3 spatial blur spot matched filter employing a prior art averaging process.

FIG. 23 is a 3×3 spatial blur spot matched filter employing a prior art averaging process. As can be seen, the presence of spiky noise in this processed image is much more apparent in comparison to the smart averaging processed image shown in FIG. 22.

The measure of image processing performance can be determined based on the standard deviation statistics for the two images shown in FIGS. 22-23. In FIG. 22, the standard deviation statistic is 1.8. The standard deviation for the prior art spatial filter shown in FIG. 23 is approximately 13. Thus, the smaller standard deviation provided by the smart averaging process for the image in FIG. 22 as a result of application of the smart averaging process demonstrates the improved noise filtering of the smart averaging process.

Thus, the different embodiments provide a computer implemented method, apparatus, and computer usable program code for multi-function signal-to-noise enhancement. An ordered set of signal data values is received. The ordered set of signal data values includes a maximum data value and a minimum data value. A closeness threshold is determined based on the set of signal data values. At least one signal data value is selected from the set of signal data values to form a subset of selected data values. A data value is selected if a difference between the data value and a reference data value is less than the closeness threshold. The reference data value is a data value from the ordered set of signal data values. In one embodiment, the reference data value is the maximum data value. In another example, the reference data value is the minimum data value.

The subset of selected data values is averaged to form an average. The average is output as a new signal data value with an enhanced signal-to-noise ratio.

Smart averaging enhances timely detection of signals in intermittent, spiky noise environments. Detection of targets and control of false alarms is also improved. Smart averaging also reduces size, weight, and cost of current sensor systems. Finally, smart averaging provides a process for inferring signal or noise presence based exclusively on rank order amplitude filtering of in situ data with no external signal or noise cueing requirements. In this manner, smart averaging filter is able to exclude non-stationary, spiky noise contaminated signal samples from the signal averaging process to produce an averaged signal sample with an increased signal-to-noise ratio.

The different embodiments can take the form of an entirely hardware embodiment, an entirely software embodiment, or an embodiment containing both hardware and software elements. In one embodiment, the features are implemented in software, which includes, but is not limited to, firmware, resident software, and microcode. For example, the features can be implemented in signal processing software modules on general purpose computers, digital signal processing (DSP) chip, field programmable gate arrays (FPA) integrated circuit, and application specific integration circuit (ASIC) chips utilizing firmware programming. For example, the smart averaging filter can be implemented entirely as software, entirely as hardware, or as a combination of hardware and software. The rank order filter may also be implemented entirely as software, entirely as hardware, or as a combination of hardware and software.

In one embodiment, the smart averaging process is implemented as a software algorithm (rank order amplitude with closeness thresholds} uploaded to general purpose computers. Unique implementations of smart averaging for enhanced speed, broadcasting of smart averaging results and size, weight, power reductions are possible by programming the smart averaging algorithm(s) in custom hardware signal processors, including digital signal processors (DSP), field programmable gate arrays (FPGA) and application specific integrated circuits ASIC.

The description of the embodiments has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus for signal-to-noise enhancement, the apparatus comprising:
   a rank order filter configured to order each signal data value in a set of signal data values based on a signal amplitude of the each signal data value to form an ordered set of signal data values, wherein the rank order filter receives an input data stream and orders the input data in a data stack as a set of "N" signal samples having a number of groups;
   a comparator configured to calculate a closeness threshold based on the ordered set of signal data values, wherein the comparator receives the ordered set of data values from the rank order filter, wherein the comparator selects at least one signal data value from the ordered set of signal data values ordered by the rank order filter to form a subset of selected data values using a reference signal data value, wherein the reference signal data value is a maximum data value in the set of ordered data values, wherein low data value signals in the set of ordered data values are unwanted noise, and wherein the closeness threshold is calculated by multiplying a user input integer "k" by the variance "sigma0"; and
   a signal averager configured to generate a signal average and calculate a signal variance, wherein the signal averager averages the subset of selected data values selected from the ordered set of data values by the comparator to form the signal average using a spike adaptive time delay algorithm.

2. The apparatus of claim 1 wherein the comparator selects the at least one signal data value for inclusion in the subset of selected data values if a difference between the at least one signal data value and the reference signal data value is less than the closeness threshold.

3. The apparatus of claim 1 wherein the signal averager outputs the signal average as a new signal data value with an enhanced signal-to-noise ratio.

4. The apparatus of claim 1 wherein the comparator multiplies a standard deviation for the set of signal data values by a user selected integer to form the closeness threshold.

5. The apparatus of claim 1 wherein the comparator divides a difference between the maximum data value and a minimum data value for the set of signal data values by a user selected integer to form the closeness threshold.

6. The apparatus of claim 1 wherein the comparator selects the at least one signal data value for exclusion from the subset of selected data values if a difference between the at least one signal data value and the reference signal data value is less than the closeness threshold.

7. A method for signal-to-noise enhancement, the method comprising:
receiving an ordered set of signal data values, wherein each signal data value in the ordered set of signal data values is ordered by a rank order filter based on a signal amplitude of the each signal data value, wherein the rank order filter receives an input data stream and orders the input data in a data stack as a set of "N" signal samples having a number of groups;
determining a closeness threshold based on the ordered set of signal data values using a comparator;
selecting at least one signal data value from the ordered set of signal data values to form a subset of selected data values using a reference signal data value, wherein the at least one signal data value is selected when a difference between the at least one signal data value and the reference data value that is less than the closeness threshold determined, and wherein the reference signal data value is a maximum data value in the set of ordered data values, wherein low data value signals in the set of ordered data values are unwanted noise signals, and wherein the closeness threshold is calculated by multiplying a user input integer "k" by the variance "sigma0";
averaging the subset of selected data values to form a signal average using a signal average; and
outputting the signal average as a new signal data value using a spike adaptive time delay algorithm.

8. The method of claim 7 wherein the step for determining a closeness threshold further comprises:
multiplying a standard deviation for the set of signal data values by a user selected integer to form a closeness threshold value.

9. The method of claim 7 wherein the step for determining a closeness threshold further comprises:
dividing a difference between a maximum data value and a minimum data value from the ordered set of signal data values by a user selected integer to form a closeness threshold.

10. The method of claim 7 wherein the ordered set of signal data values includes a maximum signal data value and a minimum signal data value.

11. The method of claim 7 wherein the method is implemented in a hardware filter.

12. A non-transitory computer program product comprising:
a computer readable storage medium having computer usable program code for signal-to-noise enhancement, the computer readable storage medium comprising:
computer usable program code for receiving an ordered set of signal data values, wherein each signal data value in the ordered set of signal data values is ordered by a rank order filter based on a signal amplitude of the each signal data value, wherein the rank order filter receives an input data stream and orders the input data in a data stack as a set of "N" signal samples having a number of groups;
computer usable program code for determining a closeness threshold based on the ordered set of signal data values using a comparator, wherein the closeness threshold is calculated by multiplying a user input integer "k" by the variance "sigma0";
computer usable program code for selecting at least one signal data value from the set of signal data values to form a subset of selected data values using a reference signal data value, wherein the at least one signal data value is selected when a difference between the at least one signal data value and the reference signal data value is less than the closeness threshold, and wherein the reference signal data value is a maximum data value in the set of ordered data values, and wherein low data value signals in the set of ordered data values are unwanted noise signals;
computer usable program code for averaging the subset of selected data values to form an average using a signal average; and
computer usable program code for outputting the average as a new signal data value using a spike adaptive time delay algorithm.

13. The A non-transitory computer program product of claim 12 further comprising:
computer usable program code for receiving a set of consecutive two-dimensional pixel images for a given time interval, wherein the set of consecutive pixel images includes at least two pixel images; and
computer usable program code for selecting a given pixel in each pixel image in the set of pixel images to form the set of signal data values, wherein the given pixel selected from each pixel image is a pixel corresponding to a same pixel location in each pixel image; and
computer usable program code for iteratively selecting a next given pixel in each pixel image to form a next set of signal data values in response to a determination that additional unprocessed pixels remain, and wherein a new signal data value for each set of signal data values forms a new pixel image with an enhanced signal-to-noise ratio.

14. The A non-transitory computer program product of claim 12 further comprising:
computer usable program code for receiving a single two-dimensional pixel image comprising a plurality of pixels;
computer usable program code for selecting a subset of pixels from the plurality of pixels in the pixel image to form the set of signal data values; and
computer usable program code for iteratively selecting a next subset of pixels from the plurality of pixels in the pixel image to form a next set of signal data values in response to a determination that additional unprocessed pixels remain, and wherein a new signal data value for each set of signal data values for the pixel image forms a new pixel image with an enhanced signal-to-noise ratio.

15. An apparatus for signal-to-noise enhancement, the apparatus comprising:
a rank order filter configured to order each signal data value in a set of signal data values based on a signal amplitude of the each signal data value to form an ordered set of signal data values, wherein the rank order filter receives an input data stream and orders the input data in a data stack as a set of "N" signal samples having a number of groups;
a comparator configured to calculate a closeness threshold based on the ordered set of signal data values, wherein the comparator receives the ordered set of data values from the rank order filter, wherein the comparator selects at least one signal data value from the ordered set of signal data values ordered by the rank order filter to form a subset of selected data values using a reference signal data value, wherein the reference signal data value is a minimum data value, wherein high data value signals in the set of ordered data values are unwanted noise signals, and wherein the closeness threshold is calculated by multiplying a difference between a maximum data value and the minimum data value by q, wherein q ranges from 1 to 16, and dividing the total by 16; and a signal averager configured to generate a signal average and calculate a signal variance, wherein the signal averager averages the subset of selected data values selected from the ordered set of data values by the comparator to form the signal average using a spike adaptive time delay algorithm.

16. The apparatus of claim 15 wherein the comparator selects the at least one signal data value for inclusion in the subset of selected data values if a difference between the at least one signal data value and the reference signal data value is less than the closeness threshold.

17. The apparatus of claim 15 wherein the comparator divides a difference between the maximum data value and a minimum data value for the set of signal data values by a user selected integer to form the closeness threshold.

18. The apparatus of claim 15 wherein the comparator selects the at least one signal data value for exclusion from the subset of selected data values if a difference between the at least one signal data value and the reference signal data value is less than the closeness threshold.

19. A method for signal-to-noise enhancement, the method comprising:

receiving an ordered set of signal data values, wherein each signal data value in the ordered set of signal data values is ordered by a rank order filter based on a signal amplitude of the each signal data value, wherein the rank order filter receives an input data stream and orders the input data in a data stack as a set of "N" signal samples having a number of groups;

determining a closeness threshold based on the ordered set of signal data values using a comparator, wherein the closeness threshold is determined by multiplying a difference between a maximum data value and a minimum data value by q, wherein q ranges from 1 to 16, and dividing the total by 16;

selecting at least one signal data value from the ordered set of signal data values to form a subset of selected data values using a reference signal data value, wherein the at least one signal data value is selected when a difference between the at least one signal data value and the reference data value that is less than the closeness threshold determined, and wherein the reference signal data value is a minimum data value, and wherein high data value signals in the set of ordered data values are unwanted noise signals;

averaging the subset of selected data values to form a signal average using a signal averager; and outputting the signal average as a new signal data value using a spike adaptive time delay algorithm.

20. A non-transitory computer program product comprising:

a computer readable storage medium having computer usable program code for signal-to-noise enhancement, the computer readable storage medium comprising:

computer usable program code for receiving an ordered set of signal data values, wherein each signal data value in the ordered set of signal data values is ordered by a rank order filter based on a signal amplitude of the each signal data value, wherein the rank order filter receives an input data stream and orders the input data in a data stack as a set of "N" signal samples having a number of groups;

computer usable program code for determining a closeness threshold based on the ordered set of signal data values using a comparator, wherein the closeness threshold is determined by multiplying a difference between a maximum data value and a minimum data value by q, wherein q ranges from 1 to 16, and dividing the total by 16;

computer usable program code for selecting at least one signal data value from the set of signal data values to form a subset of selected data values using a reference signal data value, wherein the at least one signal data value is selected when a difference between the at least one signal data value and the reference signal data value is less than the closeness threshold, and wherein the reference signal data value is a minimum data value, and wherein high data value signals in the set of ordered data values are unwanted noise signals;

computer usable program code for averaging the subset of selected data values to form an average using a signal averager; and computer usable program code for outputting the average as a new signal data value using a spike adaptive time delay algorithm.

* * * * *